(12) United States Patent
Comerford et al.

(10) Patent No.: US 10,937,004 B2
(45) Date of Patent: Mar. 2, 2021

(54) BEHAVIORALLY INFORMED SCHEDULING SYSTEMS AND METHODS

(71) Applicant: CORE DE VIE, LLC, Boston, MA (US)

(72) Inventors: Mark F. Comerford, Boston, MA (US); Ellen K Comerford, Boston, MA (US)

(73) Assignee: CORE DE VIE, LLC, Burlington, MA (US)

( * ) Notice: Subject to any disclaimer, the term of this patent is extended or adjusted under 35 U.S.C. 154(b) by 804 days.

(21) Appl. No.: 15/054,834

(22) Filed: Feb. 26, 2016

(65) Prior Publication Data

US 2016/0350721 A1 Dec. 1, 2016

Related U.S. Application Data

(63) Continuation-in-part of application No. 13/973,607, filed on Aug. 22, 2013, now abandoned.
(Continued)

(51) Int. Cl.
*G06Q 30/00* (2012.01)
*G06Q 10/10* (2012.01)
*H04L 29/08* (2006.01)

(52) U.S. Cl.
CPC ..... *G06Q 10/1095* (2013.01); *G06Q 10/1093* (2013.01); *H04L 67/306* (2013.01)

(58) Field of Classification Search
CPC .......... G06Q 30/0255; G06Q 30/0235; G06Q 10/105; G06Q 10/103; G06Q 10/067; G06Q 30/02; G06Q 10/06315; G06Q 40/00; G06Q 30/00; G06Q 30/06; G06Q 10/1093; H04Q 7/20; H04L 67/306
See application file for complete search history.

(56) References Cited

U.S. PATENT DOCUMENTS 7,222,082 B1* 5/2007 Adhikari ................ G06Q 10/06
705/7.22
2002/0194022 A1 12/2002 Comite
(Continued)

OTHER PUBLICATIONS

Wang, et al. Adaptive Appointment Systems With Patient Preferences; vol. 13, No. 3, Summer 2011, pp. 373-389; Manufacturing & Service Operations Management (Year: 2011).*
(Continued)

*Primary Examiner* — Patricia H Munson
*Assistant Examiner* — Uche Byrd
(74) *Attorney, Agent, or Firm* — Lando & Anastasi, LLP

(57) ABSTRACT

Systems and methods for scheduling at least one time slot. The method includes determining that a plurality of resources specified in the plurality of characteristics are available during at least one time slot, generating a suggestion model by providing the plurality of characteristics to a machine learning program using an iterative convergent computational method, applying a plurality of inputs to the suggestion model to generate at least one suggested calendar entry for the at least one time slot, the at least one suggested calendar entry having the plurality of characteristics requesting the plurality of resources during the at least one time slot; and adjusting presentation attributes of the plurality of suggested calendar entries based on properties of an interface window presenting the suggested calendar entries.

24 Claims, 12 Drawing Sheets

Related U.S. Application Data

(60) Provisional application No. 62/121,250, filed on Feb. 26, 2015.

(56) References Cited

U.S. PATENT DOCUMENTS

| | | | |
|---|---|---|---|
| 2003/0088534 | A1 | 5/2003 | Kalantar et al. |
| 2004/0109137 | A1 | 6/2004 | Bubie et al. |
| 2005/0137925 | A1 | 6/2005 | Lakritz et al. |
| 2007/0043766 | A1 | 2/2007 | Nicholas et al. |
| 2009/0254370 | A1 | 10/2009 | Kondo et al. |
| 2010/0094680 | A1* | 4/2010 | Ellis ............. G06Q 10/02 705/7.18 |
| 2010/0293029 | A1* | 11/2010 | Olliphant ......... G06Q 10/109 705/7.19 |
| 2010/0333137 | A1* | 12/2010 | Hamano ............ H04H 60/46 725/39 |
| 2011/0282664 | A1 | 11/2011 | Tanioka et al. |
| 2012/0117153 | A1 | 5/2012 | Gunasekar et al. |
| 2012/0258433 | A1 | 10/2012 | Hope et al. |
| 2013/0290061 | A1 | 10/2013 | Reichman |
| 2014/0136259 | A1* | 5/2014 | Kinsey, II ........ G06Q 10/1095 705/7.16 |
| 2014/0278671 | A1* | 9/2014 | Leonhardt ........ G06Q 10/1095 705/7.19 |
| 2015/0379429 | A1* | 12/2015 | Lee ................ G06N 99/005 706/11 |

OTHER PUBLICATIONS

"Screenshots of Calendar and Business Management Portal" Mindbody Online Business Management Software. Accessed Aug. 17, 2013. www.mindbodyonline.com.

"Screenshots of Calendar and Business Management Portal" Mindbody Online Business Management Software. Accessed Aug. 19, 2013. www.mindbodyonline.com.

"Screenshot of Account Profile View" GoRecess. Accessed Sep. 12, 2013. www.gorecess.com/my_account.

"Screenshot of Search Feature to Locate Classes Nearby to User" GoRecess. Accessed Sep. 12, 2013. www.gorecess.com.

* cited by examiner

FIG. 10A

Table 1

| System: | 8.07% | CPU LOAD | Threads | 661 |
| User: | 59.89% | | Processes: | 178 |
| Idle: | 32.03% | | | |

Table 2

| ENERGY IMPACT | Graphics Card: | High Perf. | BATTERY (Last 12 hours) |
| | Remaining charge: | 71% | |
| | Time until full: | 1:16 | |
| | Time on AC: | 0:29 | |

Table 3

| Packets in: | 3,974 | PACKETS | Data received: | 3.1 MB |
| Packets out: | 4,055 | | Data sent: | 872 KB |
| Packets in/sec: | 1 | | Data received/sec: | 80 bytes |
| Packets out/sec: | 0 | | Data sent/sec: | 54 bytes |

Table 4

| System: | 5.22% | CPU LOAD |
| User: | 37.47% | |
| Idle: | 57.31% | |

Table 5

| System: | 9.01% | CPU LOAD | Threads: | 651 |
| User: | 57.63% | | Processors: | 169 |
| Idle: | 33.37% | | | |

BEHAVIORALLY INFORMED SCHEDULING SYSTEMS AND METHODS

RELATED APPLICATIONS

This application is a continuation-in-part of and claims priority under 35 U.S.C. § 120 to U.S. application Ser. No. 13/973,607, entitled "SYSTEMS AND METHOD FOR STREAMLINING SCHEDULING," filed Aug. 22, 2013; this application also claims priority under 35 U.S.C. § 119(e) to U.S. Provisional App. No. 62/121,250, entitled "BEHAVIORALLY INFORMED SCHEDULING SYSTEMS AND METHODS," filed Feb. 26, 2015, both of which applications are incorporated herein by reference in their entirety.

BACKGROUND

Technical Field

The technical field generally relates to resource planning, and more particularly, to systems and methods for scheduling of events.

Background Discussion

Most people are familiar with the task of scheduling meetings, appointments and other events using a virtual calendar. Businesses catering to health and fitness related services use virtual calendars to schedule various resources such as professional staff, equipment, and rooms. Businesses will often provide clients with a web-based portal or other interface that enables clients to view available classes, make a reservation, and alter their previous reservations using these virtual calendars. In addition, front-desk employees and administrative staff may perform scheduling operations through similar interfaces.

Software that is designed to aid in the scheduling of events exists. The popularity of digital calendars such as Microsoft® Office Outlook® available from Microsoft Corp. of Redmond Wash. and Google Calendar available online from Google Inc. of Mountain View Calif. has largely homogenized the look-and-feel, function, and usability of existing systems. The traditional task of scheduling an event consists of selecting a time slot within a calendar, and entering various characteristics for the event. A user generally enters specific characteristics for the event using one or more windows and/or views and then submits the event to be published to the calendar. Once the event has been published, the event appears relative to the time slot in which the event coincides.

SUMMARY

Information Technology (IT) infrastructure is changing as storage, processing, and networking become more distributed. The migration of many computer resources to distributed networks using servers that are hosted by a service provider is becoming prevalent for a many business sectors. Those distributed networks can be stand alone networks where all the computation and processing is done by the hosted provider with a simple communications terminal for input or it can be a hybrid of local processing along with distributed processing. The distributed processing is often referred to as Hosted, Software As A Service (SAAS), Cloud, Fog, or other descriptions or characterizations. Distributed processing systems typically include banks of hardware and software servers that are either owned for proprietary use or leased to clients for use from minutes or hours to long-term leases lasting years. The banks are distributed geographically to serve various geographic markets. The locations are often chosen for the purposes of providing ample electricity—sometimes co-located with power plants, and are also strategically located to provide appropriate network bandwidth to communicate with each market. Bandwidth charges by providers typically increase as distance increases so appropriate choice of service location is relevant to cost.

Cost considerations are important for all aspects of the distributed computing including processing power and reliability through redundancy, storage capability and reliability through redundancy, and available short and long distance network bandwidth. Whether the systems are proprietary or leased, increased demand for storage, processing power, and network bandwidth results in increased cost. Cloud computing with services such as Amazon Cloud provide a wide range of computing solutions and associated costs. Their services allow for elastic and real time scalable management of storage, memory, processing power, and geographically based bandwidth. Their costs are associated with each configuration and increase as resources are increased. They also offer spot markets where customers can bid on unused available computing power in order to manage costs. An excerpt of Amazon's current offering is included below which describes the vast breadth of capability available.

Amazon EC2 instances are grouped into 10 families: first and second generation Standard instances, High-Memory, High-CPU, Cluster Compute, Cluster GPU, High I/O, High Storage, High Memory Cluster, and t1.micro. Standard Instances have memory to CPU ratios suitable for most general purpose applications; second generation Standard instances provide higher absolute CPU performance for CPU intensive applications; High-Memory instances offer larger memory sizes for memory-intensive applications, including database and memory caching applications; and High-CPU instances have proportionally more CPU resources than memory (RAM) and are well suited for scale out compute-intensive applications. Cluster Compute Instances provide a very large amount of computational power coupled with a high performance network making them ideal for High Performance Compute (HPC) applications and other demanding network-bound applications; Cluster GPU instances take advantage of the parallel processing capabilities of NVIDIA Tesla GPUs for high performance parallel computing; High I/O instances provide very high, low latency, I/O capacity using SSD-based local instance storage for I/O-intensive applications; High Storage instances provide high storage density and sequential I/O performance for data warehousing, Hadoop and other data-intensive applications; and High Memory Cluster instances provide high amounts of CPU and memory in addition to network performance for memory-intensive analytics and scientific computing. t1.micro instances provide a small amount of CPU with the ability to burst to higher amounts for brief periods. When choosing instance types, you should consider the characteristics of your application with regards to resource utilization and select the optimal instance family and size.

One of the advantages of EC2 is that you pay by the instance hour, which makes it convenient and inexpensive to test the performance of your application on different instance families and types. One good way to determine the most appropriate instance family and instance type is to launch test instances and benchmark your application.

It is imperative that computing service users/clients find ways to remain competitive and it is clear that using computing resources appropriately is a material component of remaining competitive. Regardless whether the resources are proprietary or leased from a service such as Amazon, costs increase with increased resources.

Current practices in planning and scheduling for many markets do not optimize computing resources. The tables below show the usage for network usage, CPU usage, energy impact for the scheduling and purchase of a single fitness appointment. The process requires multiple mouse clicks, processor, and network data transmissions with significant latency and consumption of computing resources at each step.

Table 1 in FIG. 10A shows the measurable increase on the CPU load throughout the process.

Table 2 in FIG. 10A shows the energy impact on the system which has the effect of reducing battery life for mobile systems.

Table 3 in FIG. 10A shows the network bandwidth required for the process—cumulatively approximately 1.5 MB for the process.

Table 4 in FIG. 10A shows that simply moving the mouse around the screen provides measurable usage of computing power.

Storing redundant data required for the booking and check out process in profiles, as described herein, can reduce the computing and network resources required for the process. It is possible to rely on the processor to suggest appropriate schedules and resources such that the computing resources can be reduced by as much as a factor of ten by using the profiles to reserve the resources that are typically manually selected sequentially, thus reducing computing power and network bandwidth requirements. This efficiency gains in computing resources is applicable to both local on site systems and distributed systems as the use of profiles reduces computing cycles.

Table 5 in FIG. 10A shows the energy impact of the production of a single report which is only 1 of dozens required to understand the workings of a business.

In a similar fashion to scheduling, the reporting can be broken down into profiles where only required information based on configurable reports is obtained thus reducing computing requirements as opposed to conventional reporting where system resources are not optimized.

Tables 6-8 in FIG. 10B show the CPU usage, Energy Impact, and Network Impact, respectively, of both historic performance reporting and future forecast reporting.

All un-necessary utilization decreases battery life in mobile devices, both consumer devices and in store POS devices. It also increases cost based on processing power, storage, and network charges in these emerging hosted and elastically configurable servers and storage.

Current systems serving hospitality and service segments use dozens of pre-configured reports where multiple reports are required to be downloaded and manipulated to understand the performance of committed, as well as available, capacities of the business. There is often redundant data contained in the multiple reports. Multiple reports are often required as some reports are lacking some critical pieces of information and are sometimes based on human estimates of input parameters. Reports also often require further formatting to be used in analytical software.

The baseline utilization prior to the initiation of any scheduling and reporting functions described above are shown by the black lines. In the case of the data, it is visible that the reporting functions for 7 critical three-month reports including Sales, Sales by Product, Gross Margin, Attendance and associated Revenue, Sales Forecast and Attendance Forecast, and Inventory required 28.7 MB of Data. The use of a combined processor, memory and network along with the accumulated historic data can be used to materially reduce system requirements on any or all of the applications. It is also possible to reduce system utilization requirements and latency with an appropriate design of the user interface where mouse movements and clicks, memory usage, and processor usage are minimized by suggesting selection options using an historic profile and collocating the appropriate selection action method with any input variables.

These improvements in computing resources scale accordingly as the data sets and features become larger. This is true for both local computing and remote computing systems. Cloud computing centers provide scalable APIs and servers where additional computing power is automatically engaged as the size of the data ebbs and flows. A common form of solving machine learning problems uses a master/slave cluster of computing resources and a file system that allows large amounts of data to be processed simultaneously. The clusters are typically redundant for reliability reasons, usually requiring three slave processors all working on an identical subset of the full data set. In addition, all of the data is sent over a long range network structure. The data transfer costs and computing equipment costs also scale in an associated manner Accumulating the data in representative statistical forms and maximizing the acceptance of suggested events from the scheduling systems directly reduces the computing costs of remote computing centers. An example of this is Hadoop (offered by the Apache Software Foundation) which is an open source code file system HDFS to map and reduce data in large data sets. This can be applied to the identifiers and features associated with the scheduling system and machine learning methods described herein.

Aspects and embodiments disclosed herein present scheduling systems and methods that direct the creation of calendar entries in a manner that is simpler and more efficient than conventional scheduling systems. For instance, some embodiments disclosed herein manifest an appreciation that the creation of a calendar entry, such as a reservation for a service (e.g., a class, session, consultation, or the like), is largely duplicative and time consuming for users. To make matters worse, the task of creating calendar entries, or modifying existing calendar entries, is often complicated by a large amount of required fields and confusing and flawed interfaces. Therefore, many of the embodiments disclosed herein include a scheduling system and a user interface that ease the administrative burden associated with conventional scheduling systems. In some embodiments, the scheduling system maintains user profiles that are associated with characteristics of previously created calendar entries or other behavior exhibited by a user. The user interface provides an interface to the scheduling system which enables displaying of schedules, creating calendar entries, and modifying existing calendar entries. As explained further below, the user interface and scheduling system enable an unconventional level of simplicity in scheduling by leveraging user profiles to eliminate the necessity of entering redundant characteristics for calendar entries.

The scheduling systems and methods disclosed herein target a wide variety of industries which schedule based on resource availability. A non-limiting list of services that may perform scheduling using these systems and methods include fitness, personal training, physical therapy, salon services, spa services, massage therapy, yoga, Pilates, and martial arts. Fitness services may include health care and medical services, nutrition services, and the like. Other categories of resource scheduling may be addressed according to various embodiments, such as provided for by food service, fuel delivery, grocery delivery, parcel delivery, hospitality services, banking services, and the like. Thus, embodiments are not limited to supporting services belonging to particular categories or possessing particular characteristics, but rather include supporting any repeating behavior exhibited by a user.

According to various aspects and embodiments, a system for scheduling at least one time slot is provided. The system includes a memory; at least one processor coupled to the memory; and a scheduling component executable by the at least one processor. The scheduling component is configured to receive a request to generate a suggested calendar entry, the request including an identifier of a profile; identify a plurality of characteristics of the suggested calendar entry specified in the profile; determine that a plurality of resources specified in the plurality of characteristics are available during at least one time slot; generate a suggestion model by providing the plurality of characteristics to a machine learning program using an iterative convergent computational method; apply a plurality of inputs to the suggestion model to generate at least one suggested calendar entry for the at least one time slot, the at least one suggested calendar entry having the plurality of characteristics requesting the plurality of resources during the at least one time slot; and adjust presentation attributes of the plurality of suggested calendar entries based on properties of an interface window presenting the suggested calendar entries.

In the system, the plurality of characteristics may include a price and the scheduling component is configured to determine the price based on a temporal difference between an identified time and the at least one time slot.

In the system, the scheduling component may be configured to determine the temporal difference based on a physical proximity between a location of a user associated with the profile and a location of at least one resource of the plurality of resources.

In the system, the scheduling component may adjust the price proportionally in relation to a size of the temporal difference.

In the system, the price may be based on a rate of a service provider and the scheduling component may be configured to identify the rate as being at least one of a minimum rate, a maximum rate, a percentage rate, and an hourly rate based on the temporal difference.

In the system, the at least one suggested calendar entry may include a plurality of suggested calendar entries and the system is configured to present the plurality of suggested calendar entries in decreasing order of relevance.

In the system, presentation attributes of the plurality of suggested calendar entries may be adjusted based on a type of device presenting the suggested calendar entries.

In the system, a link to a standard scheduling screen may be presented.

In the system, the system may comprise a point of sale and the scheduling component may be configured to provide event information to the point of sale and receive transaction information from the point of sale.

In the system, the scheduling component may be further configured to determine an adjusted forecast based on historical calendar entries.

In the system, the scheduling component may be further configured to record a cost of providing a service associated with the suggested calendar entry.

The system may further comprise an administrative user interface configured to receive input requesting manipulation between at least one event category and users.

According to another embodiment, a method of scheduling at least one time slot is provided. The method includes acts of determining that a plurality of resources specified in the plurality of characteristics are available during at least one time slot; generating a suggestion model by providing the plurality of characteristics to a machine learning program using an iterative convergent computational method; applying a plurality of inputs to the suggestion model to generate at least one suggested calendar entry for the at least one time slot, the at least one suggested calendar entry having the plurality of characteristics requesting the plurality of resources during the at least one time slot; and adjusting presentation attributes of the plurality of suggested calendar entries based on properties of an interface window presenting the suggested calendar entries.

In the method, the plurality of characteristics may include a price, further comprising determining the price based on a temporal difference between an identified time and the at least one time slot.

The method may further comprise determining the temporal difference based on a physical proximity between a location of a user associated with the profile and a location of at least one resource of the plurality of resources.

The method may further comprise adjusting the price proportionally in relation to a size of the temporal difference.

In the method, the price may be based on a rate of a service provider, and the method may further comprising identifying the rate as being at least one of a minimum rate, a maximum rate, a percentage rate, and an hourly rate based on the temporal difference.

In the method, the at least one suggested calendar entry may include a plurality of suggested calendar entries, further comprising presenting the plurality of suggested calendar entries in decreasing order of relevance.

The method may further comprise adjusting presentation attributes of the plurality of suggested calendar entries based on a type of device presenting the suggested calendar entries.

The method may further comprise presenting a link to a standard scheduling screen.

The method may further comprise providing event information to a point of sale; and receiving transaction information from the point of sale.

The method may further comprise determining an adjusted forecast based on historical calendar entries.

The method may further comprise recording a cost of providing a service associated with the suggested calendar entry.

The method may further comprise presenting an administrative user interface configured to receive input requesting manipulation between at least one event category and users.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed subject matter. Particular references to examples and embodiments, such as "an embodiment," "an example," "another embodiment," "another example," "some embodiments," "some examples," "other embodiments," "an alternate embodiment," "various embodiments," "one embodiment," "at least one embodiments," "this and other embodiments" or the like, are not necessarily mutually exclusive and are intended to indicate that a particular feature, structure, or characteristic described in connection with the embodiment or example and may be included in that embodiment or example and other embodiments or examples. The appearances of such terms herein are not necessarily all referring to the same embodiment or example.

Furthermore, in the event of inconsistent usages of terms between this document and documents incorporated herein by reference, the term usage in the incorporated references is supplementary to that of this document; for irreconcilable inconsistencies, the term usage in this document controls. In addition, the accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIG. 10A shows Tables 1-5 illustrating the effect of certain actions on system resources;

DETAILED DESCRIPTION

Figure 1:
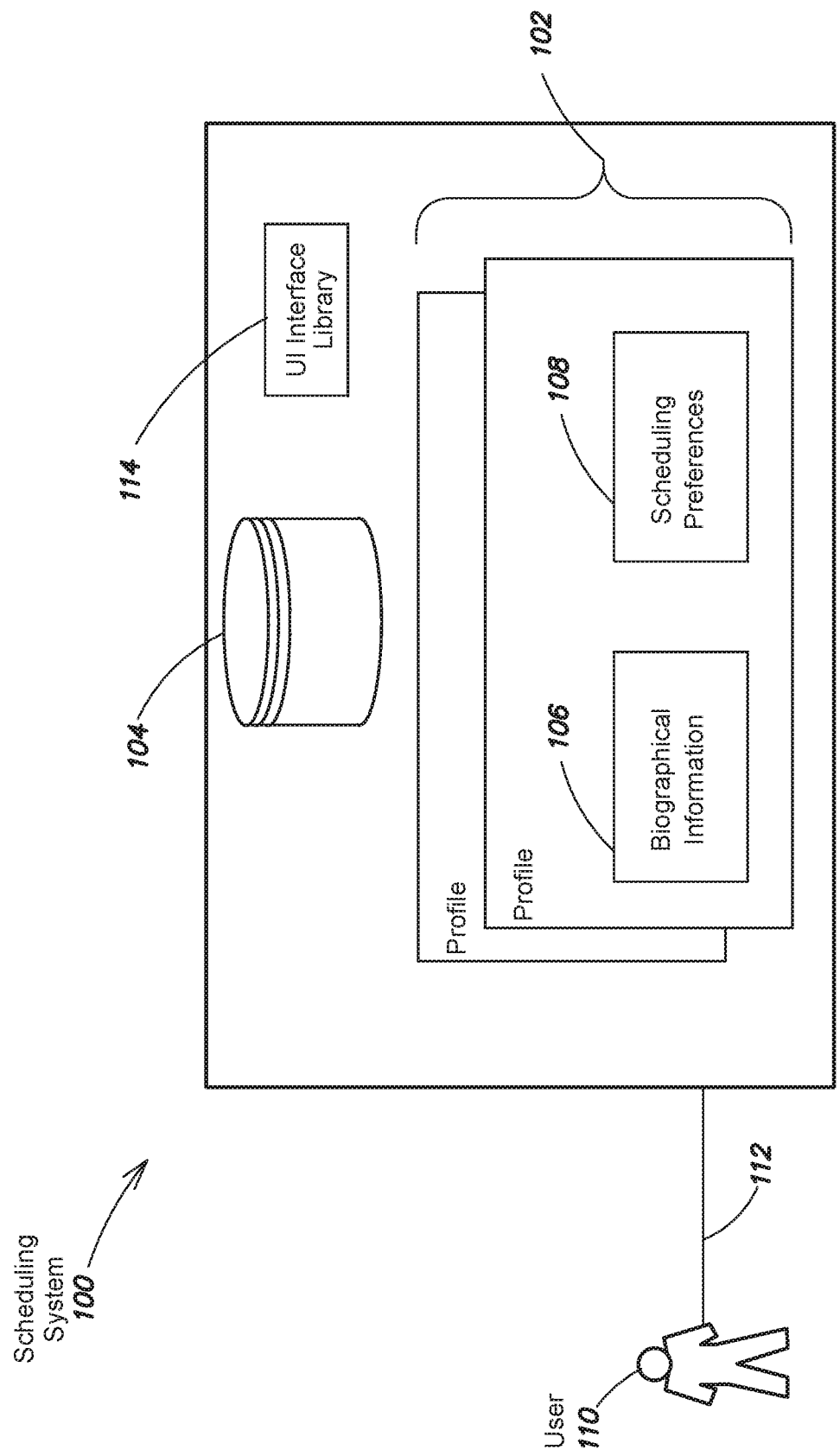
FIG. 1 is a block diagram of a scheduling system.

Some embodiments disclosed herein include systems and methods for processing scheduling requests. For example, according to one embodiment a scheduling system executes a process that receives a request to generate a suggested calendar entry. The request includes at least one identifier of a profile (e.g., a user profile, a resource profile, or profiles for other entities involved in scheduled events). In response to receiving the request, the system generates a suggested calendar entry based in part on characteristics of previously created calendar entries within the system. For instance, systems and methods in accord with some examples identify one or more preferences of users associated with a profile. Scheduling preferences may include any characteristic of previously created calendar entries and automatic entry of these scheduling preferences to enable the generation of suggested calendar entries with minimal user input. Characteristics of calendar entries may be required or optional. Required characteristics must be provided for successful creation of a calendar entry. In some embodiments, examples of required characteristics include a location, an instructor, a client, and a time. Optional characteristics may or may not be provided for any given calendar entry. In some embodiments, examples of optional characteristics include equipment, materials, or products sometimes associated with an event.

In some examples disclosed herein, the suggested calendar entries may automatically become calendar entries with minimal or no further user input. It is understood that a suggested calendar entry, in some embodiments, includes all of the characteristics necessary to generate a calendar entry within the system. In still other examples, a user may confirm that a suggested calendar entry includes the characteristics the user desires for an event. During the confirmation of a suggested calendar entry, a user may alter one or more characteristics of the event.

In some embodiments discussed further below, if a previously created calendar entry includes characteristics pertinent to, and associated with, a new scheduling request, than the characteristics of the previously calendar entry will substantially comprise the suggested calendar entry and be used in lieu of additional user input. A suggested calendar entry is any calendar entry which has been determined, at least in part, by examination of scheduling preferences and patterns of a particular profile (e.g., a user profile, a resource profile such as a profile for a service provide (e.g., an instructor) or an identified space, etc). A calendar entry, as used herein, denotes any schedulable/scheduled event which may be visualized within a calendar, stored within a data store, and utilized in subsequent scheduling processes. Examples of calendar entries include representations of schedulable services such as classes (e.g., spinning, Pilates, etc), sessions (e.g., acupuncture, facials, etc), deliveries, and pickups (e.g., grocery, fuel, prepared food, prepared beverages, etc.). It is appreciated that various events may include one or more sales transactions. These transactions may involve various tender types (methods of payment) and, therefore, characteristics of a new scheduling request may include particular, identified tender types (cash, credit card identifier, etc. . . . ).

Additionally, in some examples, a user profile may include one or more sub-profiles. In these examples, the sub-profiles may be used to organize and delineate previous scheduling requests depending on a characteristic or preference, such as a class type. For example, scheduling requests pertaining to fitness services may be contained within a particular sub-profile. Likewise, scheduling requests pertaining to other services such as spa services may be contained in one or more other sub-profiles. As will be described further below with regards to FIGS. 1-5, these sub-profiles may then be used by the scheduling system and user interface to stream-line future scheduling requests.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Profile-Driven Scheduling System

Various examples disclosed herein relate to scheduling and displaying calendar entries based on profiles. As explained further below, examples of profiles demonstrate a range of the information that may be obtained, interpreted, and associated with a profile, and how such information may be organized and delineated in a manner that aids in the creation of future calendar entries. In these examples, a profile-driven scheduling system utilizes the profiles as one source of underlying data for a calendar-centric user interface, such as those discussed further below with reference to FIGS. 2-4. FIG. 1 illustrates an example scheduling system.

FIG. 1 includes a scheduling system generally indicated at 100 that is accessed by a user 110 via a network 112. According to various examples, the scheduling system 100 is implemented using one or more computer systems, such as the distributed computer system 600 discussed below with regard to FIG. 6. In these examples, a user may access the scheduling system 100 using the network 112 (e.g., via a smart phone or other computer system using an application or web-based interface) or may directly access the scheduling system 100. Thus, examples of the scheduling system 100 include a variety of hardware and software components configured to perform the functions described herein and examples are not limited to a particular hardware component, software component, or particular combination thereof. It is understood that the scheduling system 100 may be a cloud-based service provide scheduling functionality to multiple businesses who subscribe. Users accessing the scheduling system 100 may view one or more user interface components which are branded (i.e., private labeled) to a particular business subscriber.

Still referring to FIG. 1, the network 112 may include any communication network through which computer systems exchange (i.e., send or receive) information. For example, the network 112 may be a public network, such as the internet, and may include other public or private networks such as LANs, WANs, extranets and intranets. As shown, the user 110 may utilize the network 112 to exchange data with the scheduling system 100. For example, the user 110 may access the scheduling system 100 using the network 112 from a remote computer system or from a mobile device such as a laptop or smart phone. The user 110 may interact with the scheduling system 100 to schedule calendar entries on behalf of themselves or others interested in schedulable events.

In addition, information may flow between the elements, components and subsystems described herein using a variety of techniques. Such techniques include, for example, passing the information over the network 112 using standard protocols, such as TCP/IP, passing the information between modules in memory and passing the information by writing to a file, database, or some other non-volatile storage device. In addition, pointers, identifiers, or other references to information may be transmitted and received in place of, or in addition to, copies of the information. Conversely, the information may be exchanged in place of, or in addition to, pointers, identifiers, or other references to the information. Other techniques and protocols for communicating information may be used without departing from the scope of the examples disclosed herein.

In the illustrated example, the scheduling system 100 includes one or more profiles indicated at 102, a data store 104, and UI interface library 114. The one or more profiles 102 include biographical information 106, and scheduling preference information 108. As discussed further below, the data store 104 may be configured to store the one or more profiles 102 and associated data, calendar entries, and resource information. As referred to herein, a resource may identify any schedulable resource such as people (including service providers such as staff, instructors, practitioners, beauticians, therapists, baristas, chefs, performers, doctors, attorneys, etc), equipment, identified physical spaces (e.g., rooms), identified logical spaces (e.g. a slot within a service to be provided, such as a class slot) and the like. Resources may be associated with each other, such as an identified space may be associated with equipment. The scheduling system 100 receives scheduling requests and generates suggested calendar entries based on the biographical information 106, and the scheduling preferences 108 of an identified profile. The identified profile may belong to the user 110, a user associated with the user 110, or a resource (e.g., an identified physical space). Upon receiving a scheduling request, the scheduling system 100 generates a suggested calendar entry by identifying one or more characteristics for the calendar entry which may be satisfied using information contained within the biographical information 106 and the scheduling preferences 108 associated with the identified profile. Although examples disclosed herein are directed to user profiles, it is understood that any given schedulable resource or other entity may also have a profile. For example, an identified physical space (e.g., a room) may have a profile which allows staff/professionals of a business to establish available timeslots for the identified physical space, available equipment, etc.

In the example shown, the scheduling system includes a UI interface library 114. The UI interface library 114 includes a plurality of user interface components that are specially configured for display in conjunction with a calendar control. As with other components of the system, these specialized user interface components may include data structures and executable instructions. In addition, the user interface library 114 provides a system interface through which other system components, such as the user interface 200 discussed further below with reference to FIG. 2, can request instantiation of the components housed within the library. Some examples of visualizations created by these specialized user interface components are discussed further below with regard to FIGS. 2-4.

Figure 6:
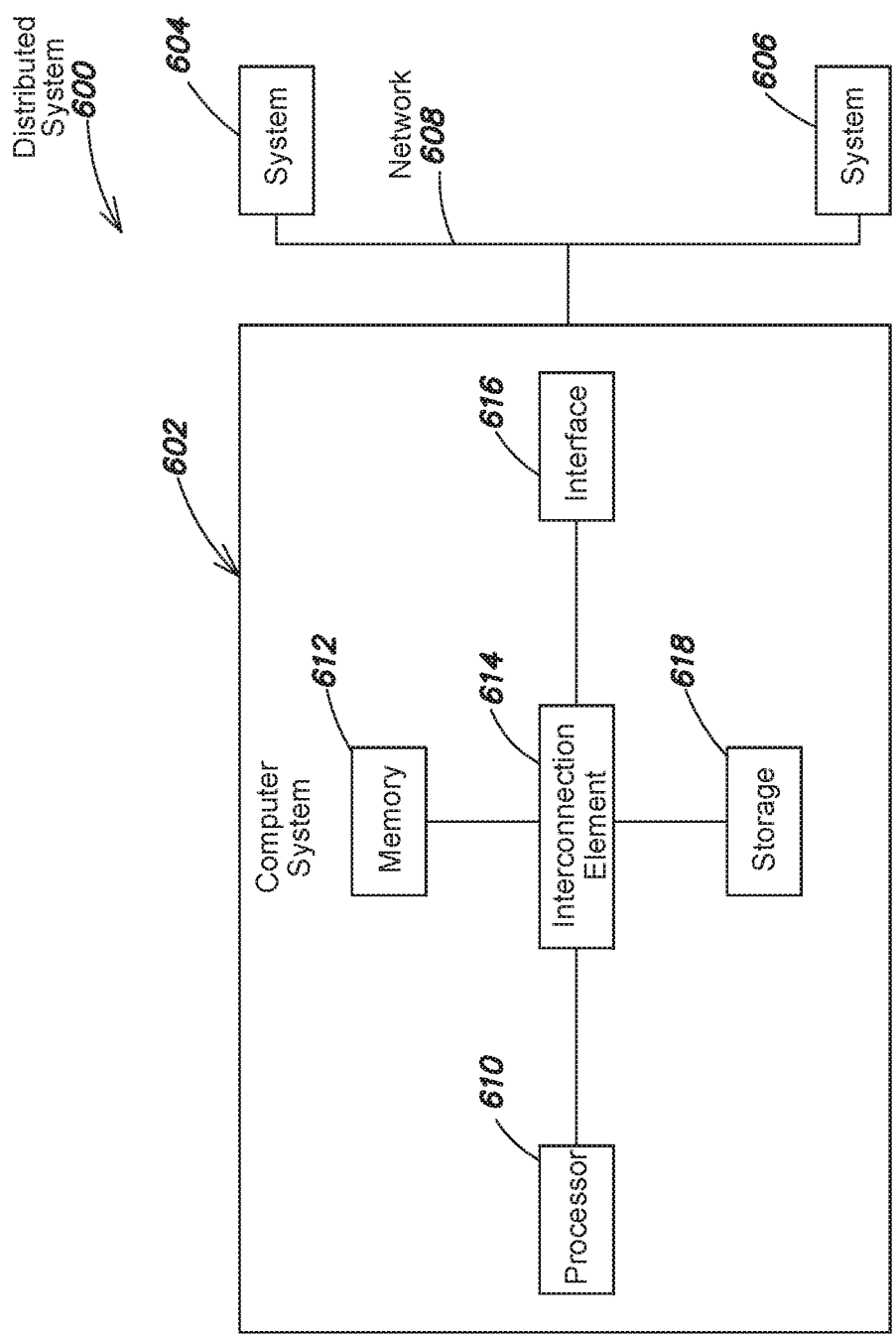
FIG. 6 is a block diagram of one example of a distributed computer system that may be used to perform processes and functions disclosed herein.

According to the example illustrated in FIG. 1, the scheduling system 100 resides on a distributed computer system, such as the distributed computer system 600 discussed below with regard to FIG. 6. However, as explained with regard to FIG. 2 below, other examples may arrange system components in a variety of configurations. For instance, in some examples, the UI interface library 114 resides on at least one client system, such as computer system 604 (FIG. 6).

The data store 104 depicted in FIG. 1 includes components that store and retrieve scheduling related information. In general, this scheduling information may include any information associated with scheduling requests and the profiles 102. Scheduling related information may consist of, for example, class schedules, service provider availability (both general and specific activities), and equipment availability. In addition, previously created calendar entries may be stored within the data store 104. These previously created calendar entries may be stored in a central data location (e.g., a table) within the data store 104 or may be held in separate tables (e.g., one table per user profile). Information pertaining to users of the scheduling system 100 may include information for clients and/or staff. In various examples, this information comprises the biographical information 106 and may include name, address, date of birth, membership status, date of enrollment, etc., for a user.

In these examples, the biographical information may also include information relating to staff/professionals and other schedulable resources. For instance, information descriptive of a date of hire, training certifications and service specialties of a schedulable profession may be contained within the data store 104. In addition, the scheduling preferences 108 of a service provider (e.g., staff member/professional) and/or other resources may be used by the scheduling system 100 when determining one or more characteristics for calendar entries, such as general availability, service types offered and service capacity (e.g., class size, production rate, etc.).

Moreover, in addition to general availability, the scheduling preferences 108 of a service provider may specify availability for specific appointment types to be made available or unavailable at certain times within the general availability for the practitioner. In one example, discounted massages are only available from 2:00 pm to 4:00 pm although the service provider is generally available from 10:00 am to 6:00 pm. It is to be appreciated that the scheduling system 100 may determine service capacity using one or more factors including the physical space in which the service will occur, the equipment available, preferences of the service provider, and the preferences of clients. In another embodiment, the system schedules practitioner or employee availability with quantity limits that are placed on any or all products or services offered. The limits may be defined for any period including but not limited to days, weeks or months. The limits may also be applied to any or all user profiles of practitioners or clients.

The monitoring component 714 and the planning system 712 may monitor the remaining available units for the specified period and display the number of remaining available units, and remove upon scheduling, the committed item or service from inventory or availability. For example, some embodiments schedule the general availability to 100% capacity with full priced appointments while limiting discounted appointments to 40% of capacity. The remaining capacity for each allowable type may be displayed in various forms such as a mouse rollover display box or in a button or dropdown list.

According to various embodiments, the data store 104 may include a wide variety of information related to processes executed by the scheduling management system. This information may include information descriptive of facility assets and attributes of assets required for performance of a service. This information may also include products associated with services, materials used to prepare the products, and the amount of time, effort, and cost of preparing the products.

Additional examples of the information stored in the data store 104 include all time horizons (e.g., differences in time between the act of scheduling and the event scheduled) associated with the suggested calendar entries, client name, calendar entry type, associated location, day and date, start time, duration, completion time, reserved logical space or equipment, logical space or equipment preferred by the client, price at time of schedule confirmation, price changes that are subsequently made at any time including at time of service performance, date and time that the calendar entry is confirmed, time horizon between the date and time of confirmation and the date and time of the calendar entry, all changes to calendar entry types and date and time of change, additions or subtractions of clients for shared instructors and the names of each client that is added or removed from the scheduled calendar entry, other suggested calendar entries that were declined or not selected at the time of scheduling, all products including prepared foods that were scheduled and prepared in conjunction with the scheduled calendar entry, payment type and payment information required to complete the payment transaction, cancellations of scheduled calendar entries, day, date, and time of cancellation, time horizon between cancellation and scheduled calendar entry, a list descriptive of the number and type of other independent calendar entries scheduled concurrently and all associated attributes and characteristics contained in this list that are related to those calendar entries, name of person or third party website that requested the suggested calendar entry, price discounts that are offered as a result of booking through a third party or commissions that are paid to the scheduling party including third party web sites, names of additional clients that have a history of accepting calendar entries at the same time and day, or date as the accepted suggested calendar entry, a list of clients who also are candidates for the suggested time slot where one or more overlapping characteristics can render a suggested time slot unavailable to them, and where a waiting list is generated based upon the list of clients described above, a record of clients that ultimately are scheduled from a waiting list, any promotions both discounted or full priced, that were offered to the client and the method that was used to offer the promotion including email, text, voice call, web site or system reminders, the time horizon between the promotional offer, and the generation of the suggested calendar entry, the allowable booking horizon prior to the scheduled suggested time slot that is maintained in the system (e.g., the time at which a suggested calendar entry may be confirmed and the resources associated therewith reserved), the physical location of the user at the time of scheduling relative to the location where the product or service is to be provided, any network or user device information needed to communicate the suggested calendar entry, any exceptions to the scheduled calendar entry where a history of suggested calendar entries contains any exceptions to one or more of the characteristics mentioned above, any additions to the scheduled calendar entry and the associated changes in duration or end time. In another embodiment, exceptions may be suggested at the time of purchase, the time of check in, or check out, or as part of the purchasing process in the POS interaction.

Exceptions can take many forms including but not limited to additional information or minor changes required for the scheduled event, additional fees or added services, or discounts that have been applied. In some embodiments, a calendar entry with all the usual characteristics with the exception of a change in start time on a given day can constitute an exception.

In some embodiments, the data store also stores the following information in one or more profiles for practitioners: payroll information, compensation information, start time and duration of services provided by the practitioner, record of service types provided by the practitioner, total hours the practitioner is available for a day and date of the service as well as the previously accepted suggested scheduled or unavailable hours. In some embodiments, the accumulated stored data from all the calendar entries both from suggested scheduled calendar entries and calendar entries not booked from suggestions are stored in the data store and associated with a profile of a business or business segment relative to the scheduled events. The accumulated data can be combined or stored separately. The data stored in the data store 104 may be used to generate the analytical business management suggestions and reporting functions disclosed herein.

The data included in the data store 104 may be gathered and interpreted from a wide variety of sources. For instance, in an example directed to fitness centers, data may be imported from existing scheduling systems. In this example, the imported data may include clients and/or staff's biographical information such as full name, address, phone number and status (e.g., membership status, employee status). In addition, the data may include previously created calendar entries and associated characteristics. For instance, data from previously created calendar entries may be stored verbatim, may be summarized, or may be partitioned with only particular elements being imported. Subsequent scheduling requests by the user 110 may be streamlined by such preferences so that a minimal amount of user input is required to generate a suggested calendar entry. Other examples of data importation include the gathering of information from social media websites such as Facebook available online from Facebook of Menlo Park, Calif. For example, in one embodiment the biographical information for a user profile may be comprised of a reference to a Facebook profile which may be queried for additional biographical information. In another example, a user profile may be shared by one or more businesses who subscribe to the cloud-based scheduling system 100 described above. In this example, the scheduling preferences 108 and/or scheduling patterns (discussed further below) may be shared and utilized between subscribing business. In another example of data importation, data descriptive of equipment utilized in a fitness center (or other facility) may be gathered via an interface exposed by fitness center sales and modeling systems. In this example, the attributes, capacities and other information regarding each piece of data center equipment may be imported into the data store 104.

In at least one embodiment, data within the data store 104 may also be generated and/or modified manually. For example, user profiles may be generated via a user interface using one or more windows and/or views. Likewise, conventional scheduling requests may be utilized to generate and/or modify the scheduling preferences 108. In one embodiment, a template user profile may be created and used to create the user profiles 102. In this embodiment, the template user data may include information descriptive of an existing user that is duplicated (i.e., copied) to create a new user with the same scheduling preferences 108.

According to various embodiments, data within the data store 104 may be interpreted to identify scheduling patterns of a users and resources. These scheduling patterns may be the basis for one or more preferences included within the scheduling preferences 108. Statistical analysis of scheduling preferences may inform the generation of suggested calendar entries. For example, if data within a user profile suggests that a user statistically prefers morning classes related to Pilates (e.g. registers for morning Pilates classes more than a threshold percentage of the time) and evening classes related to Spinning, these preferences may be represented and associated with the scheduling preferences 108. In another example, if data within a user profile suggests that a user statistically prefers a morning beverage with a particular set of ingredients (e.g., coffee with milk and sugar) and an evening beverage with another set of ingredients (e.g., tea with milk only), these preferences may be represented and associated with the scheduling preferences 108. In another example, scheduling patterns with the greatest frequency are more likely to form the basis of a suggested calendar entry. For example, if a user most frequently schedules Pilates activities, then the scheduling system 100 will be more likely to suggest a calendar entry including characteristics pertinent to Pilates. In another example, if data within a user profile suggests that a user statistically prefers a monthly delivery of groceries with a particular set of items, this preference may be represented and associated with the scheduling preferences 108. The characteristics themselves may be further narrowed based on statistical analysis of the scheduling preferences 108. Continuing a previous example, the characteristics pertinent to Pilates may include resources most frequently selected such as a particular Pilates instructor, most frequently selected equipment for Pilates, etc. Continuing another previous example, the characteristics pertinent to a grocery delivery may include a particular brand of milk, eggs, and the like.

In another example, some preferences expressed within a schedule request may lead to inclusion of other characteristics within the suggested calendar entry. For instance, if a user typically requests a first basket of groceries from a grocery delivery service at the beginning of the month and a second basket of groceries with different items and quantities in the middle of the month, then the time horizon of a request for groceries may drive the content and quantities specified in the suggested calendar entry. In this instance, requests for groceries received at the beginning of the month will result in suggested calendar entries that include the first basket of groceries, while requests for groceries received at the middle of the month will result in suggested calendar entries that include the second basket of groceries.

In other examples, the most recent scheduling patterns of a user may be given priority (e.g., more weight) during the generation of suggested calendar entries. Still further examples may include the scheduling system 100 determining one or more underlying associations between previous calendar entries. As discussed above, temporal relationships between calendar entries may provide an indication of a preferred time of day to include in a suggested calendar entry. Other underlying factors may include any relatable characteristic of previous calendar entries such as time of day, day of week, service provider gender preferences (e.g., always selecting female service providers), average timeslot duration (e.g., length of sessions), attributes of products created by the service provider (quantity, size, weight, type, ingredients), etc.

Likewise, the scheduling patterns of a staff/professional users and/or resources (e.g., an identified physical space) may be interpreted to determine one or more preferences associated with the scheduling preferences 108. As discussed further below, these preferences may be organized into sub-profiles. In addition, data from all user profiles may be interpreted globally and used advantageously by front-desk staff and managers. For example, identifying patterns of usage based on the time of year and impact of promotional offers on product production volume, enrollment and class attendance may aid in the allocation (i.e., scheduling) of resources. In this example, the scheduling system 100 may determine that additional classes or service providers should be available to accommodate seasonal demands. The scheduling system 100 may also be configured to provide a general availability for a service provider and further provide availability for specific appointment types to be made available or unavailable at certain times within the general availability. In one example, discounted massages are only available from 2:00 pm to 4:00 pm although the service provider is available from 10:00 am to 6:00 pm. Such determinations may be provided to the user 110 via components of the UI interface library 114.

One skilled in the art, having the benefit of reading this disclosure, would recognize that any data within the data store 104 may be analyzed and interpreted to determine one or more scheduling patterns to generate scheduling preferences therefrom. In addition, the data within the data store 104 may pertain to one or more subscribing businesses and be used to analyze and determine scheduling patterns.

Data, including scheduling requests, previously created calendar entries, biographical data, and scheduling preferences, may be stored in the data store 104 in any logical construction capable of storing information on a computer readable medium including, among other structures, flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance.

In one embodiment, the user profiles 102 may be based on flexible associations between data within the data store 104. To this end, the user profiles 102 may simply be a linking table which associates the biographical information 106 and the scheduling preferences 108. In another embodiment, the user profiles 102 may be stored with both the biographical information 106 and the scheduling preferences 108 within the same data structure.

In one embodiment, each time a user submits a suggested calendar entry to the scheduling system 100, characteristics of the calendar entry are recorded, categorized and used to further define the scheduling preferences 108 for a profile. For example, when a user 110 schedules a private Pilates session with an instructor, various characteristics of the calendar entry such as date and time, instructor name, and special instructions (e.g., notes from the user to the instructor indicating personal preferences of the user) are stored within the schedule preferences 108. In this example, a profile associated with the user 110 may include a sub-profile referenced as "Pilates." In another example, when a user 110 or another entity on behalf of the user 110, schedules a coffee pickup with particular ingredients, temperature, etc. at a particular location, various characteristics of the calendar entry such as date, time, coffee type, ingredients, and special instructions (e.g., notes from the user indicating temperature or other personal preferences) are stored within the schedule preferences 108. In this example, a profile associated with the user 110 may include a sub-profile referenced as "Coffee." Additional examples of the processes that the scheduling system 100 is configured to execute are described further below with reference to FIGS. 2-5.

User Interface Examples

As discussed above with reference to FIG. 1, the scheduling system 100 processes scheduling requests received from external entities such as the user 110 through the UI interface library 114. According to some examples, the UI interface library 114 includes components that are visualized in a user interface such as a calendar-centric user interface discussed below with reference to FIGS. 2-4. These interactive components may include specially configured user interface components. In at least one example, the interactive components enable a user to perform various scheduling tasks with a minimal amount of input from the user 110.

Figure 2:
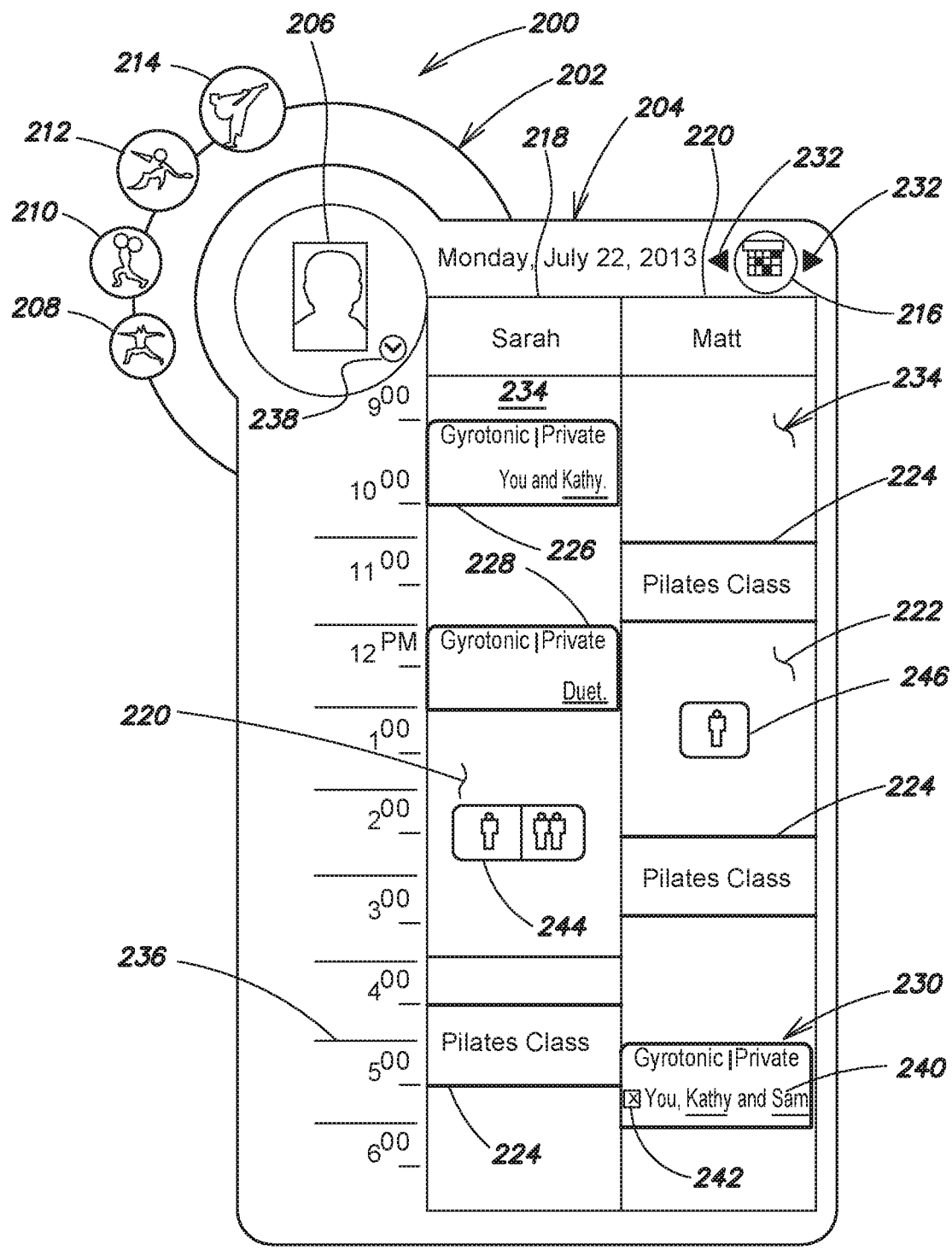
FIG. 2 is an illustration of a calendar-centric user interface.

FIG. 2 illustrates one embodiment of a calendar-centric user interface generally indicated at 200. The user interface includes a user profile frame 202, and a calendar frame 204. According to various embodiments the visualized elements of the user profile frame 202 and the calendar frame 204 may be provided by the UI interface library (FIG. 1), and visualized in various ways.

According to the embodiment shown in FIG. 2, the user profile frame 202 and the calendar frame 204 are presented in a manner where both are visible to a user. In one embodiment, the user profile frame 202 may change its visible state based on mouse events. For instance, the user profile frame 202 may be hidden in a collapsible view, or slide-out tray, and may be expanded (i.e., visualized) in response to a mouse-over event. Likewise, the loss of mouse focus may result in the user profile frame 202 being hidden from view.

In the embodiment illustrated in FIG. 2, the user profile frame 202 is illustrated as a radial dial including a primary profile representation 206, sub-profile representations 208-214, and a profile selection element 238. In one embodiment, the primary profile representation 206 visualizes at least a portion of the biographical information 106 (FIG. 1) of a user profile. For example, in the shown embodiment, the primary profile representation 206 is a silhouette of a male indicating that the biographical information relates to a male user. In other examples, a photograph or user-selectable avatar (e.g., a Facebook profile image) may be utilized. Likewise, sub-profile representations may include stock images or user-selected images for display. In at least one embodiment, only the main profile representation 206 is displayed. It is understood that the user profile frame 202 may be dynamically updated based on the data within an underlying user profile. The biographical information 106 and the scheduling preferences 108 of the underlying user profile provide numerous properties for displaying the primary profile representation 206. A non-limiting list of properties may include a user's name, date of birth, membership status and role (e.g., client or employee). As will be further discussed below with regard to FIG. 3, the primary profile representation 206 may be used during drag-and-drop operations that enable the creation of calendar entries without requiring additional user input from the user 110.

In addition, the scheduling preferences 108 (FIG. 1) within the user profile may be the basis for the sub-profile representations 208-214. For example, users who have previously scheduled Pilates classes may have the sub-profile 208 displayed. In another example, users who have previously scheduled a coffee pickup may have another sub-profile displayed. The order, magnitude, and placement of the sub-profiles 208-214 may also be based on the scheduling preferences 108 (FIG. 1). For example, if the most recent calendar entry is related to Karate, the Karate sub-profile 214 may be sized slightly larger than the other displayed sub-profiles, and placed in a position on-screen which is prominent to a user's eye. In this example, the size and relative position of previously created calendar entries using sub-profiles visualizations are arranged in a descending order where the most recently scheduled calendar entry appears first. In other examples, such arrangement may be based on configurable preferences. For instance, a user may manually configure their profile to always display a certain sub-profile in a prominent manner. In still other examples, the arrangement of sub-profiles may be based on the frequency in which a particular service type is scheduled (e.g., massage sessions, Pilates, etc). As will be further discussed below with regard to FIG. 3, the sub-profiles representations 208-214 may be used during drag-and-drop operations which enable creation of calendar entries without requiring additional user input from the user 110.

In one embodiment, the profile selection element 238 may be used to open one or more views for configuring a profile. In one embodiment, the profile selection element 238 may be a profile drop-down button. In this embodiment, configuration views, wizards, and other conventional methods of modifying a user profile may be utilized. In addition, the profile selection element 238 may allow a user to switch the user profile frame 202 to display a different profile. In this example, a user may view and manage their own profile and also associate (schedule) the profile of others with calendar entries.

Still referring to FIG. 2, the calendar frame 204 includes a time range selector 216, schedulable resources 218-220, available timeslot indicators 220-222, scheduled classes at 224, and scheduled private classes at 226-230, and a time-span representation 236. In the shown embodiment, the schedulable resources 218-220 are service providers (e.g., instructors). In other embodiments, any schedulable resource may appear at 218-220 including identified physical spaces (e.g., rooms), identified logical spaces (e.g., a slot in a class), equipment, or other resource. Likewise, in the shown embodiment, the scheduled classes 224 are of a particular service type available for scheduling. In other embodiments, the scheduled classes 224 may be other service types including sessions for physical therapy, facials, acupuncture, etc. According to the shown embodiment, the schedulable resources 218 and 220 are used as column headers for the plurality of timeslots 234 for each respective resource. In these embodiments, the schedule for a given resource may be represented using different time range representations. In the shown embodiment, the time range representation 236 is based on the hours of operation (i.e., normal business hours). In other embodiments, the time range may be configured with more precise granularity and may represent a small window of time (i.e., an hour or two) up to an entire year. One example of a particular time range may be found further below in reference to FIG. 4. In various embodiments, a user may specify a desired time range, or a particular window of time using the time-range selector 216. The time-range selector 216 may be configured with a forward/back advancement control 232 to enable selection of a particular time range. For instance, in the shown embodiment, the displayed schedule is based on a particular day of the week and selecting the advancement control 232 changes the currently selected day to either the previous day or the next day.

In some embodiments, the time range representation 236 may be altered by mouse and keyboard operations. For example, scrolling a mouse wheel over the calendar frame 204 may adjust the displayed time range representation 236 by zooming in and out (i.e., narrowing the displayed time range and broadening the displayed time range). In at least one embodiment, scrolling out may cause the calendar frame 204 to transition to displaying one or more other schedule representations. For example, scrolling out may change the schedule frame 204 to display the calendar frame 404 in FIG. 4. In another example, the time range selector 216 may include an icon which enables a user to select a different time range to be displayed. Changing the schedule frame 204 may advantageously enable larger time ranges to be represented while still maintaining a user's ability to review schedules and make modifications.

In the embodiment shown, various calendar entries (224, 226 and 228) are displayed in columns beneath the schedulable resources headers 218-220. The various calendar entries are visualized against the time range representation 236 based on characteristics of the calendar entries (e.g., start time, end time, etc). In addition, the various calendar entries may be visualized according to various characteristics pertaining to the calendar entry. For example, group classes 224 may be represented in an "open class" manner and will exclude any restriction visualization. In contrast, private calendar entries (e.g., calendar entry 226-230) may indicate a "private" status indicator in the form of a title or icon indicating the calendar entry is restricted to a certain user or users. Calendar entry 230 illustrates one example of a private calendar entry with an associated status indicator 240 which is visualized in a plain English syntax. Other embodiments may illustrate status indicators using icons such as a lock or exclamation point. For example, a scheduled coffee pickup may represented by an icon of a coffee cup. It is understood that any characteristic of a calendar entry may be used when visualizing calendar entries such as calendar entry 240. This includes, but is not limited to, displaying images associated with one or more associated users (e.g., a Facebook profile picture, an avatar, etc), setting a background color of the displayed calendar entry, and providing highlighting in the form bolding or other accentuations.

In addition, it is understood that scheduling operations may be enabled by visualized controls within a displayed calendar entry. For example, calendar entry 230 includes a scheduling function button 242. In the embodiment shown in FIG. 2, the scheduling function button 242 enables a user to remove (or dissociate) their user profile from an existing calendar entry. In other embodiments, other scheduling function buttons/controls may be visualized. For example, a button may be visualized which enables additional user profiles to be associated with the calendar entry (e.g., a plus sign). Still other examples include the ability to execute functions related to one or more user profiles associated with calendar entry. For example, the status indicator 240 may include hyper-links which enable information to be viewed about other user profiles associated with the calendar entry 230.

A given resource may not be available to schedule over an entire time range. In one embodiment, time slot availability may be indicated by one or more visual representations such as the available time slot indicators 220 and 222. In this embodiment, a user may determine a time slot is available based on the coloration of the timeslot indicators 220 and 222. In addition, a user may determine a particular preference/restriction the available timeslot has. For example, the available time slot indicators may include a preference indicator such as preference indicators 244 and 246. The preference indicators 244 and 246 may visualize one or more preferences for a given time slot. For example, preference indicator 244 indicates that private and/or group sessions (classes) may be scheduled within the available slot. In contrast, preference indicator 246 indicates that only private sessions may be scheduled. Other preference indicators may be displayed to indicate whether product pickups or deliveries (e.g., prescription drug pickups, coffee pickups, pizza deliveries, etc.) may be scheduled within particular time slots. Using the preference indicators 244-246 users may be able to quickly determine which available time slots are open to the type of calendar entry they wish to schedule. Further examples illustrating the use of preference indicators and available time slot indicators are discussed below with reference to FIGS. 3-4.

In other embodiments additional, visualizations may indicate a preference of a given available time slot. For example, in one embodiment karate may be a preferred class for the available time slot 222. In this embodiment, a karate icon or other visualization indicating karate may be used as the preference indicator 246. In another example, the preference indicator may visualize a resource availability identifier such as an equipment availability identifier. In this example, a user may easily identify a timeslot which includes the desired number of available equipment based on the equipment availability identifier. After identifying the time slot with the desired equipment available, the user may execute an operation (e.g., drag-and-drop as discussed below with reference to FIG. 3) referencing the preference indicator which schedules the timeslot as a "trio" (i.e., reserving the equipment for themselves and two others). Subsequently, two other user profiles may be associated with the scheduled trio using one or more of the operations discussed further below. In yet another example, the scheduling system 100 may identify that a user is requesting to create a calendar entry in which they typically reserve certain equipment or other resources (i.e., a particular trainer, tanning room, massage therapist, etc.). If such a request exceeds the available resources, a user may be prompted with one or more suggestions to alternatively satisfy the request. In one embodiment, the suggestion may include an alternate day/time for the calendar entry. In another embodiment, the suggestion may include an alternate trainer, identified space (e.g., room), or other comparable resource.

Figure 3:
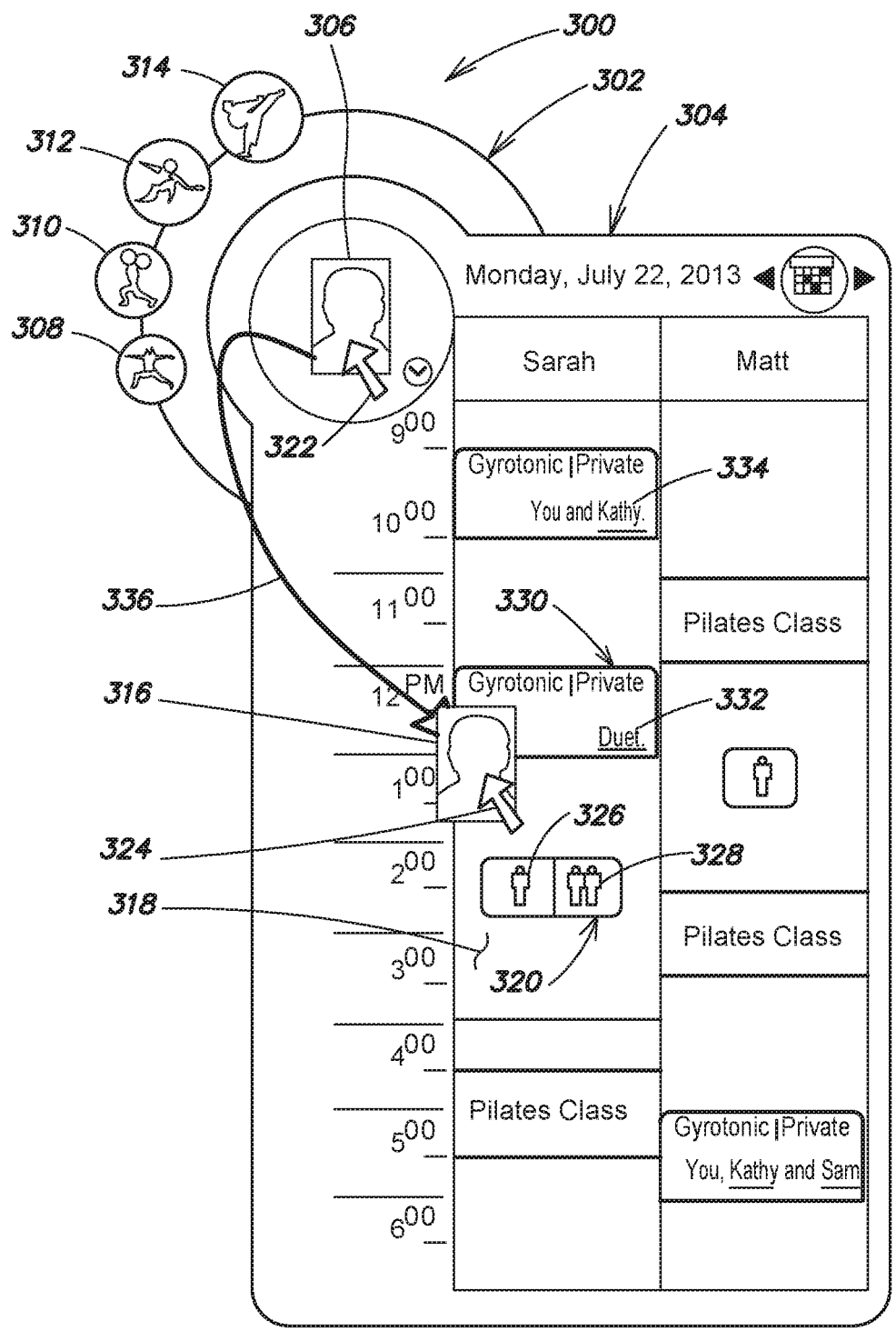
FIG. 3 is another illustration of a calendar-centric user interface.

As discussed with regards to FIG. 2, the primary profile representation 206 and sub-profile representations 208-214 may be used to generate a suggested calendar entry via a drag-and-drop operation of the mouse cursor. It is understood that the drag-and-drop operation may also be performed using a gesture on a touch screen of a touch-sensitive device, such as a tablet and smart phone. FIG. 3 illustrates another embodiment of the calendar-centric user interface 200 from FIG. 2 generally designated at 300. The calendar-centric user interface 300 includes a user profile frame 302, and a calendar frame 304. The user profile frame 302 includes a primary profile representation 306 and sub-profile representations 308-314. The calendar frame includes an available time slot indicator 318, a scheduled private group calendar entry 330, a preference indicator 320, and a drag-and-drop path 336 of the primary profile representation 306. As discussed about with reference to FIG. 1, the primary profile representation and/or the sub-profile representations 308-314 may be used to create a calendar entry via a drag-and-drop operation. In one embodiment, a user may select a profile representation to drag, such as the profile located at the first mouse position 322. The dragged profile 316 may then be dragged over the available time slot indicator 318 as indicated by the mouse drag path arrow 336. Once the cursor is at a second position 324 over the time slot indicator 318, a user may drop (release) the dragged profile 316 over the time slot indicator 318. In one example, the user drops the dragged profile 316 over any region of the available time slot indicator 318 to generate a suggested calendar entry.

In various embodiments, the act of selecting a profile representation to drag may cause one or more calendar entries and the available time slot indicator 318 to change visual state. For example, the selection of the sub-profile representation 308 may cause all of the non-Pilates classes to be hidden from view. In an alternate example, the selection of the sub-profile representation may cause all of the Pilates calendar entries (e.g., calendar entry 330) to become highlighted. The highlighting of calendar entries based on profile selection may aid a user in identifying calendar entries pertaining to a particular profile or sub-profile which they are most interested in scheduling. In another example, selection of a profile representation may cause the available time slot indicator 318 to change visual state. In this example, selection of the primary profile representation 306 may cause the time slot indicator 318 to be visualized while deselecting may cause the time slot indicator 318 to be hidden from view. In still another example, selection of a profile representation may cause the available time slot indicator 318 to display a preference indicator, such as a resource availability indicator as discussed above with reference to FIG. 2. It is understood that selection of a profile representation may also be performed by hovering or by focusing over a particular profile representation. For example, a mouse cursor hover over, or a finger hover-over in a hover-over enabled tablet or smart phone, may select a profile representation according to the examples disclosed above.

In one embodiment, the drag-and-drop operation may be performed utilizing the scheduling preference indicator 320. In this embodiment, a user may release the dragged profile 316 over the preference indicator 320. For example, if the dragged profile 316 is released over the private preference indicator 326, a suggested calendar entry will be generated with one characteristic set as a private session. Conversely, if the dragged profile 316 is released over the private group preference indicator 328, a suggested calendar entry will be generated with the characteristic of being a private group calendar entry. In another example, the dragged profile 316 may be dropped over the private group calendar entry 330. In this example, the scheduling system 100 (FIG. 1) determines if the dragged user profile 316 is allowed to join the private group calendar entry 330. If the scheduling system 100 (FIG. 1) determines that the dragged user profile 316 is allowed to join the private group calendar entry 330, the scheduling system 100 (FIG. 1) may provide a confirmation to the user to indicate the success of the scheduling operation.

In one embodiment, the confirmation may be a change in the calendar entry status 332. In this embodiment, the calendar entry status 332 may be changed from the status of "Duet" to that of "Trio" to indicate that three user profiles are associated with the private group calendar entry 330. In another embodiment, the calendar entry status 332 may be changed to include an indication that the user's profile has been associated with the calendar entry in addition to an indication of other profiles already associated with the calendar entry, such as the example calendar entry status at 334. As will be discussed below with regard to FIG. 4, responsive to a drag-and-drop operation, the scheduling system 100 (FIG. 1) may receive the request to generate a suggested calendar entry and determine one or more characteristics that may be satisfied from the scheduling preferences 108 (FIG. 1) in order to create a calendar entry in the scheduling system 100 (FIG. 1) and perform associated processes. It is further understood that certain other operations executed by the user may also execute functions of the scheduling system 100 (FIG. 1). For instance, as discussed with reference to FIG. 2, visualized controls within the calendar frame 204 (FIG. 2) may execute scheduling functions such as those similar to drag-and-drop. In various embodiments, scheduling function controls (e.g., scheduling function control 242 of FIG. 2) enable operations that include, but are not limited to, generating a suggested calendar entry, confirming a suggested calendar entry, modifying a suggested calendar entry, modifying an existing calendar entry, removing an existing calendar entry, disassociating/associating user profiles with existing calendar entries, viewing user profile information, and manipulating the displayed time range.

In other embodiments, the scheduling system 100 (FIG. 1) may be configured to process natural language commands (e.g., commands generated from written or spoken words). Natural language commands may be embodied in various electronic forms and may be exchanged with users via one or more interfaces. Examples of natural language commands include recorded audio signals received via a microphone or other sound recording apparatus and text messages received via a keyboard or other text input mechanism. In one embodiment the scheduling system 100 (FIG. 1) includes a voice-enabled system through which users execute natural language commands by speaking the commands and receive audio responses from the scheduling system 100. In another embodiment, the scheduling system 100 (FIG. 1) includes a text message-enable system through which users execute natural language commands by generating text messages and receive text message responses from the scheduling system 100.

Thus, in some embodiments, the scheduling system 100 adapts the presentation of information to a communication medium that best suits the device utilized by the user. In these embodiments, the scheduling system 100 may vary the number of suggested calendar entries based on the communication medium of the interface. For example, for audio-based interfaces and visual interfaces with smaller display areas, the scheduling system 100 may provide fewer options than for visual interfaces with larger display areas. In another example, the scheduling system 100 may provide suggested calendar entries in decreasing order of relevance. This order of relevance may be defined, for example, by the inclusion of stronger preferences vs. weaker preferences and required characteristics vs. optional characteristics vs. characteristics without a value. The scheduling system 100 may also provide a link to a standard scheduling screen along with the suggested calendar entries.

In some embodiments, the scheduling system 100 adapts the presentation of information to the properties of an interface window presented to the user. In these embodiments, the scheduling system 100 may constantly monitor these properties of the interface, including the dimensions (e.g., height and width) of the interface window, the location of the interface window on a display device (e.g., a computer monitor), the interface window's position with respect to other windows (e.g., whether it is obscured by another window), or other properties. As those properties change, the information displayed in the interface window may be dynamically determined. For example, if the interface window is resized to a smaller size, the scheduling system 100 may automatically modify the data displayed in the interface window to display only higher priority calendar entries.

In some embodiments, the automatic modification of the data displayed in the interface window may be determined based on which dimension(s) of the interface window have been changed. For example, if the width of the interface window is reduced (i.e., the interface window is made narrower), the number of calendar entries displayed may be unchanged, but the amount of information presented about each entry may be reduced in order to fit within the narrower window. If the height of the interface window is reduced, the number of calendar entries may be reduced to display only higher priority calendar entries.

In some embodiments, the scheduling system 100 is configured to visually distinguish suggested calendar entries with missing values from complete suggested calendar entries (entries with values for all characteristics). For example, the scheduling system 100 may display complete suggested calendar entries in a color coded format or geometric format that differs from suggested calendar entries with missing values. Alternatively or additionally, the scheduling system may provide complete suggested calendar entries in a section that is different from the section including suggested calendar entries with missing values.

In some embodiments, the user 110 (FIG. 1) may access the scheduling system 100 via a computer system, such as the computer system 602 in FIG. 6. The computer system may be a kiosk-based computer positioned within a business for the purpose of providing users a convenient location to perform scheduling related tasks. The computer system may also be a mobile computing device such as a smart phone or laptop computer. Within the context of a voice-enabled scheduling system 100, the computer system may include a microphone and speakers. In these embodiments, the user 110 (FIG. 1) may generate a suggested calendar entry by speaking one or more natural language commands. For instance, the spoken commands may be as simple as "schedule me for Pilates for 11 am," which cause the scheduling system 100 (FIG. 1) to generate a suggested calendar entry for the Pilates Class 330 based on the user profile associated with the user 110. In another example, the spoken command may be "schedule a monthly grocery deliver for me," which cause the scheduling system 100 (FIG. 1) to generate a suggested calendar entry for a grocery delivery based on the user profile associated with the user 110.

It is to be appreciated that natural language commands may involve several parameters and require the scheduling system 100 to execute one or more complex processes. For example, a voice command such as "schedule me for a private Gyrotonic session with Matt" may cause the scheduling system 100 (FIG. 1) to determine the characteristics for the suggested calendar entry requested in the command based on data within the data repository 104 (FIG. 1) (e.g., the user profile) and external data such as the current date and time. In this example, the current date and the resource's availability will be analyzed by the scheduling system 100 (FIG. 1) to suggest and/or automatically create the suggested calendar entry. In some situations the resource may be unavailable at the requested time. In this situation, the scheduling system 100 may prompt the user with suggestions for alternate resources that are available to satisfy the request. For example, if Matt is requested but is unavailable, the scheduling system 100 (FIG. 1) may suggest another trainer who is available to the user 110 (FIG. 1) via an audio response transmitted to the user's mobile computing device.

In another embodiment, the characteristics may not be fully satisfied by the natural language command and the available data. In this embodiment, the scheduling system 100 (FIG. 1) may prompt the user for additional details to generate a suggested calendar entry. The prompt may be on-screen or in the form of audio response. A user may then choose from one or more suggested characteristics of the suggested calendar entry to generate a final calendar entry within the scheduling system 100 (FIG. 1). For example, if a user executes the voice command "schedule me for Pilates this morning," the scheduling system 100 may suggest a trainer based on the scheduling preferences 108 and available times for the suggested trainer. It is understood that any of the scheduling operations defined herein may be also executed by one or more natural language commands. Further, it is appreciated that the previous examples of spoken natural language commands may also be received by the scheduling system 100 in the form of a text string (e.g., via a text message, email, etc). In response to receiving such a text string, the scheduling system 100 performs scheduling functions as specified in the text string (i.e., scheduling functions equivalent to those specified within the spoken equivalents of the text string).

One skilled in the art, having the benefit of reading this disclosure, would understand that the scheduling functions described above may be combined with conventional scheduling operations. For example, a user may select double-click the available time slot indicator 318 to perform conventional scheduling activities using conventional selection tools such as a mouse or keyboard. However, it is recognize that even conventional scheduling activities are enhanced and computing resources are reduced by the scheduling system 100, which may identify one or more characteristics that may be satisfied by preferences within the scheduling preferences 108 (FIG. 1). For example, conventional scheduling activities may be streamlined by the scheduling system 100 reducing the amount of input required to generate a calendar entry. This may be manifested by one or more fields within a view for creating calendar entries to be eliminated or pre-populated with data from the scheduling preferences 108 (FIG. 1).

Figure 4:
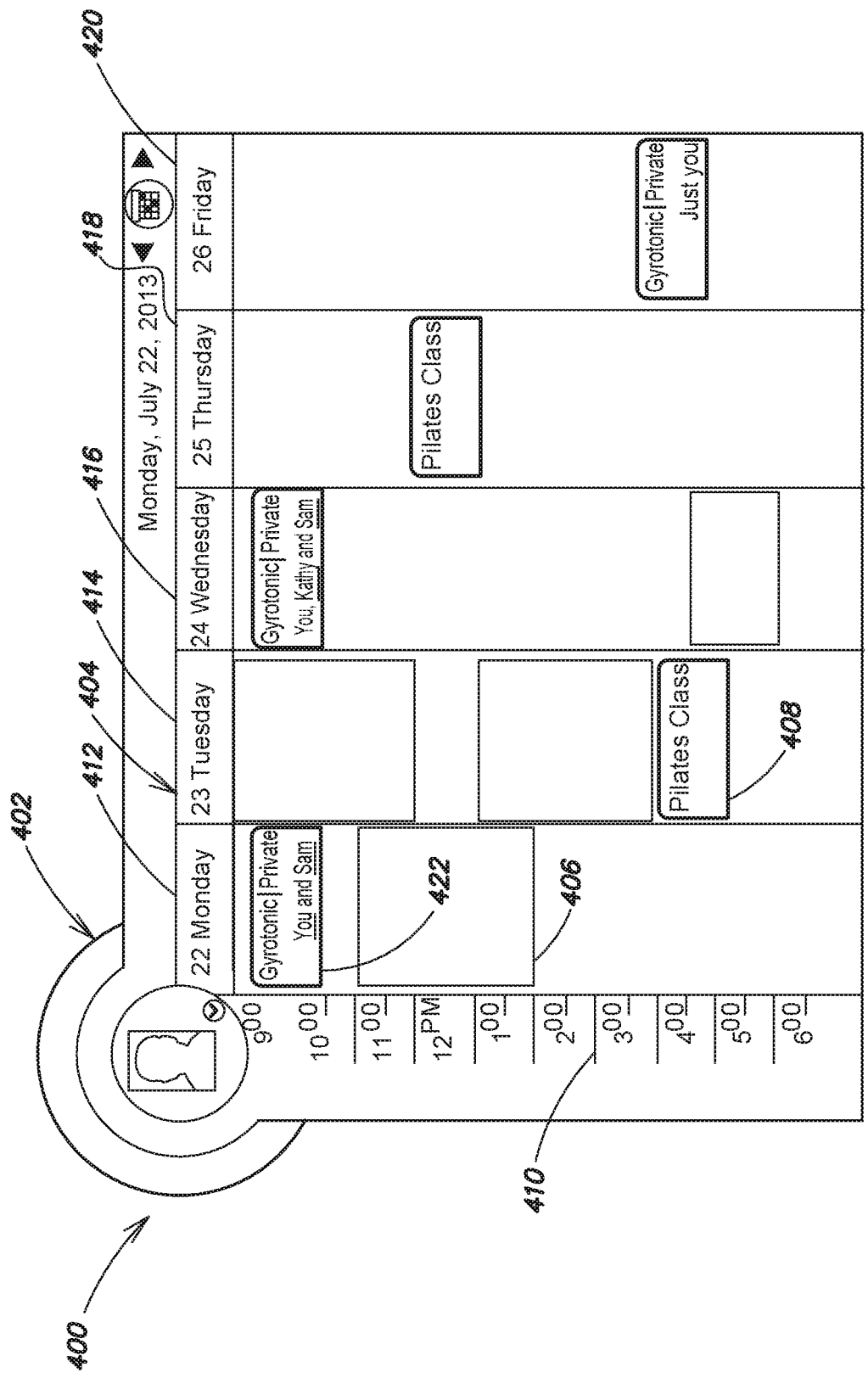
FIG. 4 is another illustration of a calendar-centric user interface.

FIG. 4 illustrates the calendar-centric user interface 200 from FIG. 2 with an expanded time range generally indicated at 400. The calendar-centric user interface 400 includes a user profile frame 402, and a calendar frame 404. The calendar frame 404 may include a time range indicator 410, an available timeslot indicator 406, a private group calendar entry 422, a class calendar entry 408, and column headers 412-420. In shown embodiment, the calendar entries (e.g., 226 of FIG. 2) related to the schedulable resources 218-220 (FIG. 2) are represented per day beneath column headers 412-420. According to various embodiments, the expanded time frame enables a high level view of calendar entries with which a user profile is associated (i.e., scheduled) and/or calendar entries which a user may have interest based on the scheduling preferences 108 (FIG. 1). In one embodiment, calendar frame 404 may only visualize calendar entries for a user in which the user's profile is associated. For instance, if the user is associated with the private group calendar entry 422 than the private group calendar entry 422 will be visualized and other calendar entries not associated with the user will be excluded from the user's view (i.e., hidden). The exclusion of non-associated calendar entries may provide greater clarity to a user reviewing a schedule.

In another embodiment, the calendar frame 404 may suggest calendar entries for a user to create based on the scheduling preferences 108 (FIG. 1). For example, a user profile which includes previously scheduled Pilate classes may prompt the scheduling system 100 to visualize calendar entries which match this scheduling preference, such as calendar entry 408. In another example, various patterns may be interpreted from the biographical data 106 (FIG. 1) and the scheduling preferences 108 (FIG. 1) as discussed above with regard to FIG. 1. For example, a user profile may indicate that a user is a senior citizen based on the biographical data 106 (FIG. 1). In this example, the scheduling system 100 may suggest activities which are age-appropriate. Likewise, the data store 104 (FIG. 1) may be interpreted by the scheduling system 100 to identify past calendar entries created by other senior citizens. In this way, the scheduling system 100 may provide sufficient underlying data for the calendar frame 404 to make intelligent scheduling suggestions to a user. Continuing with this example, the scheduling system 100 may also suggest calendar entry partners (i.e., other user profiles) who share common interests (e.g., Pilates) and are of similar ages.

In another example, a user's scheduling preferences may determine the most feasible times of day to make scheduling suggestions. In this example, a user who schedules classes, pickups, deliveries, or other events primarily (e.g., more than a threshold percentage of the time) during weekday mornings may be recognized as someone who works full time. Such recognition may allow the scheduling system 100 to not suggest calendar entries which take place during hours in which the scheduling system 100 considers the user to be unavailable. Further, such recognition may also determine that weekends are fully available based on the scheduling preferences 108 (FIG. 1) and may suggest calendar entries during weekend days that would not otherwise be suggested during weekdays. It is understood that any information within the biographical information 106 and the scheduling preferences 108 may be analyzed, and in some cases, compared against other user profiles and their associated data.

In various embodiments, the scheduling system 100 (FIG. 1) includes an administrative user interface configured to exchange information with users, such as service providers and employers of service providers. The administrative user interface may include a variety of user interface elements organized according to a variety of metaphors. Using these features of the administrative interface, users of the scheduling system 100 (FIG. 1) can review categories of events attended by users. Further, in some embodiments, the administrative user interface displays information representative of users of the system categorized by types of events that the users have attended in the past. According to these embodiments, the administrative user interface is configured to receive input that indicates a request to create, update, or delete associations between users and event categories. These associations are stored in the data store 104 and used by the scheduling system 100 (FIG. 1) to generated suggested calendar entries for users. For example, where a user is historically associated with a grocery delivery category, the scheduling system 100 (FIG. 1) may periodically suggest a special delivery event in which promotional products may be delivered to the user. Further, the scheduling system 100 (FIG. 1) may associate the user with a laundry service category (i.e., a category with which the user is not historically associated) and schedule a visit by a laundry service provider for the user proximate to the grocery delivery to take advantage of the user's being home to accept the grocery delivery. Thus, using the administrative user interface, users may be associated with not only event categories for which they have historically been scheduled, but also event categories determined to be of potential interest by the scheduling system 100 (FIG. 1) or a user 110 (FIG. 1) of the scheduling system 100 (FIG. 1).

In another embodiment, the administrative interface is configured to generate mailing lists of users of the scheduling system 100 (FIG. 1). In this embodiment, the administrative interface receives input identifying, based on user profiles, a particular user, or a group of users, for which mailings are to be generated. For example, the administrative interface may receive an identifier of an individual user, a group of users, an historical event, or an event category. In response to receiving the input, the administrative interface identifies the user or users (e.g., who attended the historical event or who have attended an event belonging to the event category) and generates one or more mass mailings to the identified users. These mass mailings may be printed and sent via physical mail or may be rendered as electronic mails messages and transmitted via a network.

Particular embodiments of the scheduling system 100 (FIG. 1) are not limited to any one user interface metaphor, configuration of user interface elements, or user interface technology. For instance, in one embodiment, the scheduling system 100 (FIG. 1) serves the administrative user interface as a browser-based user interface that is rendered by a web-browser running a computer system accessible by users. In other embodiments, the administrative user interface is a specialized client program that executes outside of a browser environment, such as an application program executing on a mobile device. In these embodiments, the administrative user interface exchanges data with the scheduling system 100 (FIG. 1) through an inter-process communication mechanism, such as a protocol supported by the administrative user interface. In addition, the administrative user interface exchanges a variety of information with users. This information may include any of the information described herein with reference to the data store 104 (FIG. 1) or any of the other components of the scheduling system 100 (FIG. 1).

Scheduling Processes

Figure 5:
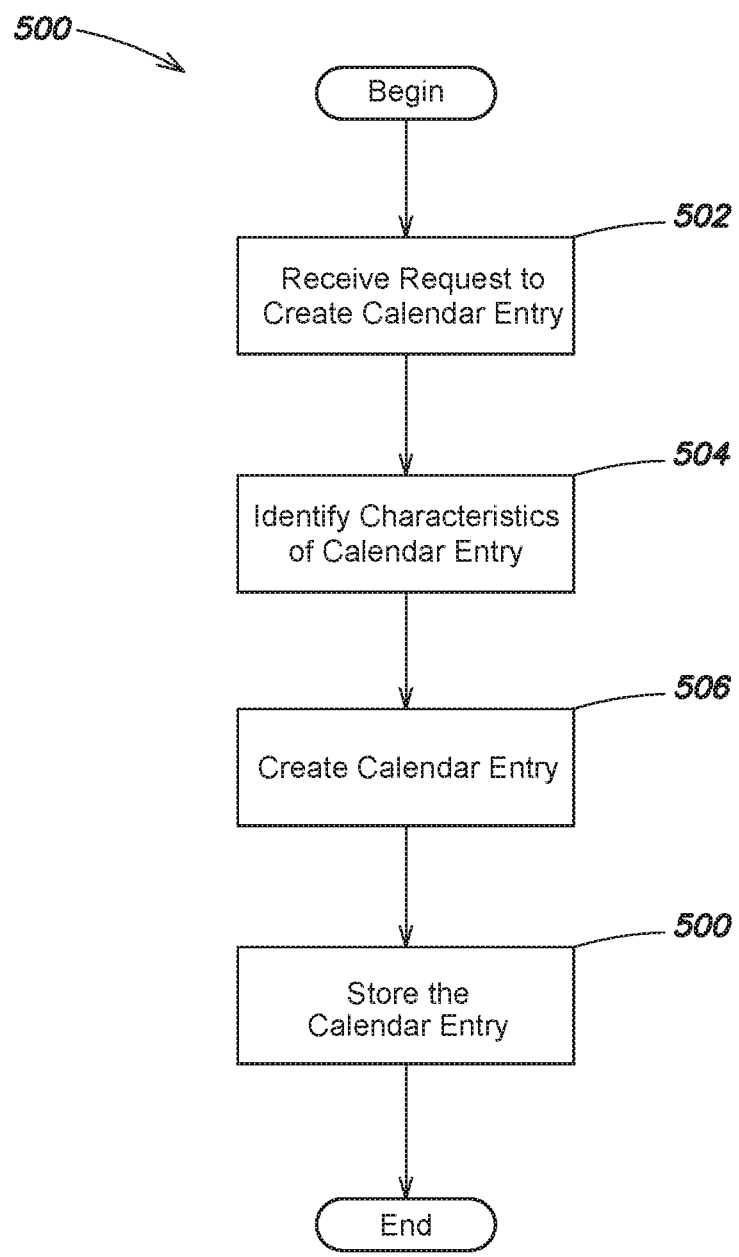
FIG. 5 is a flow diagram of a method for generating a suggested calendar entry.

An example of the method implemented by the scheduling system 100 is illustrated in FIG. 5. In this example, the process 500 includes acts of receiving a request generate a suggested calendar entry, identify a plurality of characteristics of a suggested calendar entry to create during one or more time slots, the plurality of characteristics including at least one characteristic specified by the scheduling preference information, and generate a suggested calendar entry, the suggested calendar entry having the plurality of characteristics and requesting the plurality of resources during the at least one time slot. Although various examples below are from the perspective a client-user, it is understood that process 500 may be directed to the creation of calendar entries for employees and other staff, such as professional personnel. This may include the ability for an employee/staff to utilize their profile and/or sub-profiles to create calendar entries (e.g., sessions, classes, appointments, available timeslot for classes, general availability, etc). Users can also be a staff person with a profile who is scheduling events on behalf of a client based upon the client's user profile or a direct client. Process 500 begins at 502.

In act 502, a request to create a calendar entry is received by the scheduling system 100 (FIG. 1). According to various examples, the scheduling system 100 receives the scheduling request via one or more components of the UI interface library 114 (FIG. 1). The request may include a reference to one or more time slots, one or more resources, and an identifier of one or more user profiles. In some examples, a single user profile may be identified within the request. In other examples, a plurality of user profiles may be identified within the request to create a group calendar entry. In various examples, the request to create a calendar entry is received from the user 110 (FIG. 1) via the network 112 (FIG. 1). In this example, the user 110 (FIG. 1) may access the scheduling system via a computer system, such as the computer 602 in FIG. 6. In these examples, the request may result from the user 110 (FIG. 1) executing functions (e.g., drag-and-drop operations) of the scheduling system 100 (FIG. 1) via visualized controls from the UI interface library 114 (FIG. 1). According to other examples, the scheduling system 100 receives and responds to scheduling requests initiated via other interface components that support voice, text, and email communications.

In other examples, the scheduling system 100 receives and responds to scheduling requests initiated via other interface components that communicate with external systems, such as the third party systems 708 (FIG. 7) described further below. In some of these examples, the scheduling system 100 receives a scheduling request responsive to the user interacting with a third party web site, a deal of the day web site, a mass buying power web site, or the like. The level of integration between the third party systems and the scheduling system 100 varies between embodiments. For example, the third party site may be configured to display a standard calendar interface with available time slots within a user interface provided by the third party site or may be configured to display suggested calendar entries received from the scheduling system 100 within the user interface provided by the third party site. In either case, any time slots that are scheduled via the third party site and all the characteristics associated therewith are communicated to the scheduling system 100 and stored in data store 104.

In some embodiments, requests may be automatically generated in conjunction with, or in response to, other system functions. For example, according to one embodiment, the scheduling system 100 (FIG. 1) receives and interprets a request by a user to access (e.g., log on to) the system as a request to create a suggested calendar entry for the user or another entity associated with the user in the data store 104 (FIG. 1). In another embodiment, the scheduling system 100 receives and interprets entry of a user's name as a request to create a suggested calendar entry for the user or another entity associated with the user in the data store 104. Further, it is to be appreciated that, in some embodiments, the scheduling system 100 may reference data stored outside of the request to determine the identifier included within the request. For example, the scheduling system 100 may reference data stored outside of the request that identifies a currently logged on and authenticated user when determining the user profile included within and identified by the request.

Figure 7:
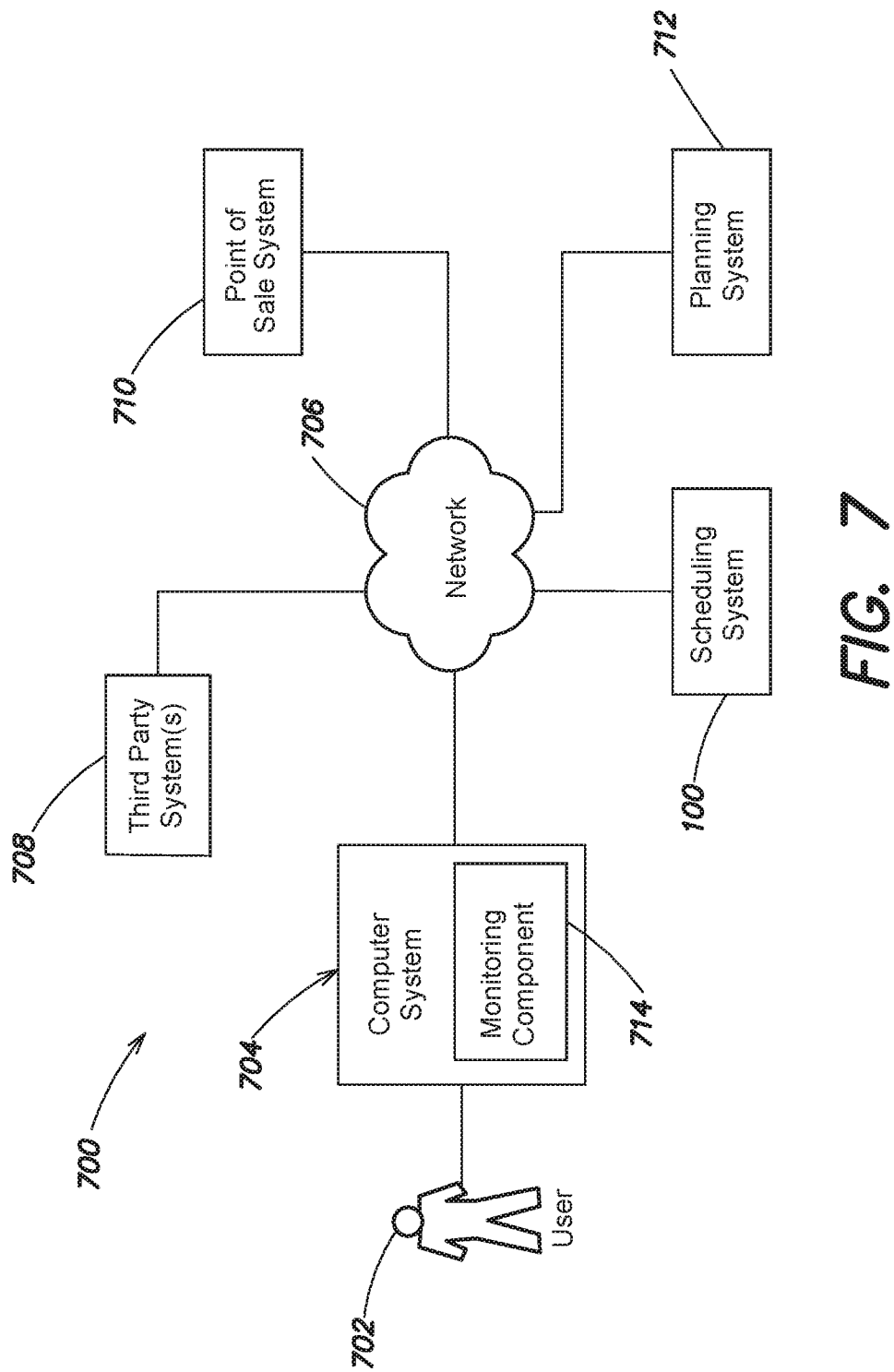
FIG. 7 is a block diagram of a scheduling system within the context of other entities that interact with the scheduling system.

In other embodiments, the scheduling system 100 receives a request to create a calendar entry from an automated source, such as an application executing on a computer system (e.g., the computer system 600 described above with reference to FIG. 6). FIG. 7 illustrates a computer system 700 that includes one arrangement of components that may generate such an automated request. FIG. 7 includes a user 702, a computer system 704, a communication network 706, a scheduling system 100, one or more third party systems 708, a point of sale system 710, a planning system 712, and a monitoring component 714. The computer system 704 may be, for example, one or more computer systems associated with the user 702 (e.g., a mobile computing device). The point of sale system 710 may be, for example, one or more computer systems associated with a service or product provider (e.g., a merchant, healthcare professional, hospitality provider, food service provider, etc.). The point of sale system may also be a cloud based point of sale system. The planning system 712 may be, for example, one or more computer systems associated with a service or product provider with whom the user 702 has interacted in the past. The network 706 may include any communication network through which computer systems exchange (i.e. send or receive) information. For example, the network 112 may be a public network, such as the internet, and may include other public or private networks such as cloud networks, LANs, WANs, extranets, and intranets.

In some embodiments, the monitoring component 714 is configured to monitor behavioral patterns of the user 702. When executing according to this configuration, the monitoring component 714 may assemble a chronology of user activity that includes, among other activities, user purchasing patterns. For example, the monitoring component 714 may utilize accelerometer and global positioning system information to record the time and geographic location of the user as the user moves from one geographic location to another. The monitoring component 714 may also utilize previously scheduled calendar entries and user profile information stored in the scheduling system 100 to build the chronology.

According to some embodiments, the monitoring component 714 is configured to interface with external information sources to exchange information regarding a user. For instance, in one embodiment, the monitoring component 714 exchanges information with the one or more third party systems 708 to determine the behavior of the user. Examples of third party systems include point of sale systems, payment systems (e.g., LEVEL UP, SQUARE, credit and debit transaction systems), or social media (e.g., FACEBOOK, FOURSQUARE). Examples of the information gathered from the third party systems 708 include purchase transaction information (e.g., products purchased, the time of purchase, store purchased from, sales price, discounts applied, method of payment used), sentiment information regarding products or services purchased, frequency and regularity of product or service purchases, frequency and regularity of visits to identified establishments, and the like.

In various embodiments, the monitoring component 714 is configured to identify repeating behavior exhibited by the user. In some embodiments, the monitoring component 714 identifies repeating behavior by analyzing the chronology. In other embodiments, the monitoring component 714 integrates the information gathered from the third party systems 708 with the chronology prior to identifying repeating behavior patterns. After identifying these repeating behavior patterns, the monitoring component 714 may facilitate them by issuing scheduling requests to scheduling system 100. Upon entering the name of the user to be scheduled in a search directory the scheduling system 100 may navigate to the appropriate suggested calendar slot and populate the slot with the suggested service type from the user profile. The user 110 may then accept the suggestion or amend it. The user 110 can also select a suggested appointment from a list and the scheduling system can automatically navigate to the suggested slot and populate it with the appointment and all associated attributes. The user 110 can also modify attributes of any suggested scheduled event from a displayed attribute list and the scheduling system 100 can populate the calendar with the amended schedule and resources. The user 110 can also select a suggested appointment type and select a start time in the calendar. The scheduling system 100 can then populate the appointment with all the profile information. In another embodiment, the user may initiate the process by selecting a calendar time slot and entering a name associated with a user profile, and further, may select an appointment or event type from a suggested list. The scheduling system 100 may then populate the time slot with the appropriate user profile and any related sub-profiles.

In some of these embodiments, the monitoring component 714 is further configured to determine and address a time horizon (i.e., a configurable parameter that specifies a period of time before which events may be scheduled) to streamline the behavior patterns. For example, if the monitoring component 714 identifies that a user purchases a coffee most weekday mornings, the monitoring component 714 may record a configurable parameter that specifies an automatic request for the barista to begin making the coffee when the user is within a specified distance (or time) from the coffee house (e.g., is almost in line, 5 minutes away, etc. . . . ). In another example, the monitoring component 714 identifies that a user makes regular visits to a health care professional (e.g., annual physicals) and records a configurable parameter that specifics an automatic request for a particular health care professional at a preferred time. In another example, the monitoring component 714 identifies that a user makes regular visits to a veterinarian and records a configurable parameter that specifics an automatic request for a particular veterinarian at a preferred time. In another example, the monitoring component 714 identifies that a user regularly order various staples and other goods from a grocery delivery service and records a configurable parameter that specifics an automatic request for a particular set of groceries to be delivered at a particular time.

According to another example, if the monitoring component 714 identifies that the user stays at a particular hotel at a particular time each year, the monitoring component 714 may record a configurable parameter that specifies an automatic request to reserve a room a predefined period of time before the identified, particular time. In some embodiments, the monitoring component 714 may interface with travel systems (e.g., KAYAK) included in the third party systems 708 to determine whether a room at the hotel at the identified, particular time is available at a particular price and, if so, may record the configurable parameter that specifies an automatic request to reserve the room at the determined rate.

According to some embodiments, the monitoring component 714 is configured to provide a user interface through which the monitoring component 714 receives selections and de-selections of the configurable parameters that specify the automatic request. This interface enables users to deactivate automatic requests according to their preferences. In other embodiments, the configurable parameters are maintained as part of a user profile (or sub-profile) stored in the scheduling system 100 and are accessible accordingly. In some embodiments, the monitoring component 714 periodically scans the configurable parameters that specify automatic requests and transmits automatic requests to the scheduling system 100 via the network 706 for any currently selected configurable parameters. This periodic scan may be triggered by an approaching time horizon to ensure that events are scheduled in a timely manner. In at least one embodiment, the periodic scans are executed every second.

In some embodiments, a monitoring component, such as the monitoring component 714 discussed above, is implemented within the scheduling system 100. In other embodiments, a monitoring component is implemented within the planning system 712. In these embodiments, the monitoring component may focus its analysis and processing on a plurality of users who utilize the product or service of the provider associated with the planning system 712. Also, in these embodiments, the planning system 712 may include additional components configured to maximize the utilization of schedulable resources associated with the provider of the product or service. For instance, the planning system 712 may transmit requests to the scheduling system 100 that target specific users as early as possible within the time horizon associated with the product or service. In one particular example, if a user is allowed to sign up for a class one month in advance, the planning system 712 may automatically transmit a request for the suggested event scheduling system 100 once that time horizon has arrived.

In some embodiments, the planning system 712 is configured to analyze cumulative histories of chronologies, scheduling patterns, seasonality, and booking time horizons to suggest prices on events to be scheduled. This analysis may result in suggested pricing that is lower for events scheduled to occur in the more distant future and higher for near term events, popular events, days, or seasons. In one example, the planning system 712 may transmit initial requests or requests to update existing calendar entries that include information regarding availability of specials or upgrades available. The planning system 712 may determine whether to offer these specials or upgrades based on user input or based on forecasted resource utilization, cash flow, or other business health metrics monitored by the planning system 712. In another example, the planning system 712 may determine the cost associated with providing a service based on allocation of fixed costs (e.g., rent for shared space, electricity, water, etc.) and variable costs (equipment depreciation, consumables utilized in providing the service (e.g., food cost), etc.) required to perform the service.

For instance, in some embodiments, the planning system 712 is configured to determine one or more suggested prices for an event available to be scheduled. The suggested prices may be based, at least in part, upon one or more identified time horizons. The time horizons may be based on the physical proximity of a user to a service provider. The event available to be scheduled may be delivery of a service or a product prepared by the service provider. For example, when executing according to the configuration described above, the planning system 712 may determine different suggested prices for a class scheduled 1 week in advance vis-à-vis 1 month in advance vis-à-vis 1 year in advance. In another example, the planning system 712 may determine different suggested prices for a cup of coffee scheduled 1 hour in advance vis-à-vis 5 minutes in advance. Further, according to this example, the planning system 712 may determine different suggested prices for a prepared lunch scheduled for a user who is half a mile away from the lunch preparer vis-à-vis a prepared lunch scheduled for a user who is 1 block away from the lunch preparer.

According to another example, the planning system 712 determines different relative suggested prices for a limited number of events when the events are scheduled according to different time horizons. For instance, the planning system 712 may determine a first price for a concert scheduled 6 months in advance and may determine a second price, which is higher than the first price, for the concert when scheduled 1 week in advance.

Figure 9:
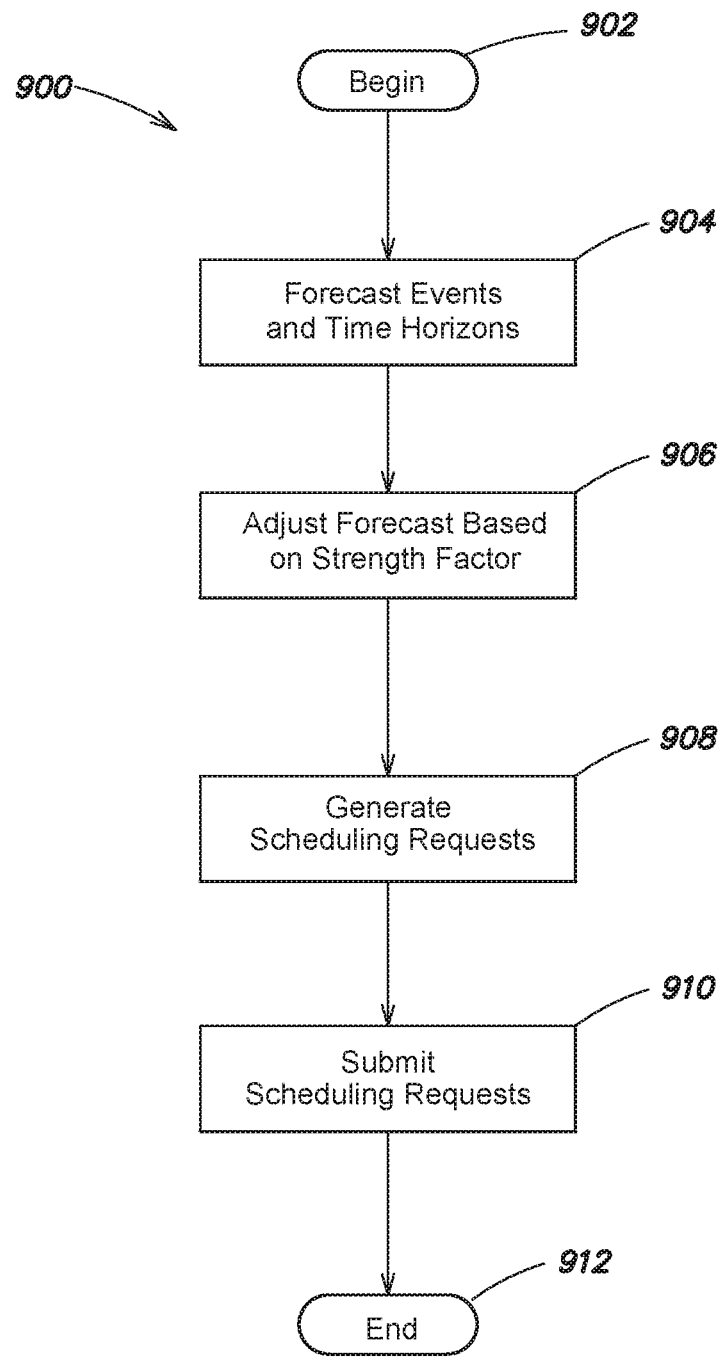
FIG. 9 is a flow diagram of a method for generating a self-fulfilling forecast.
Figure 10B:
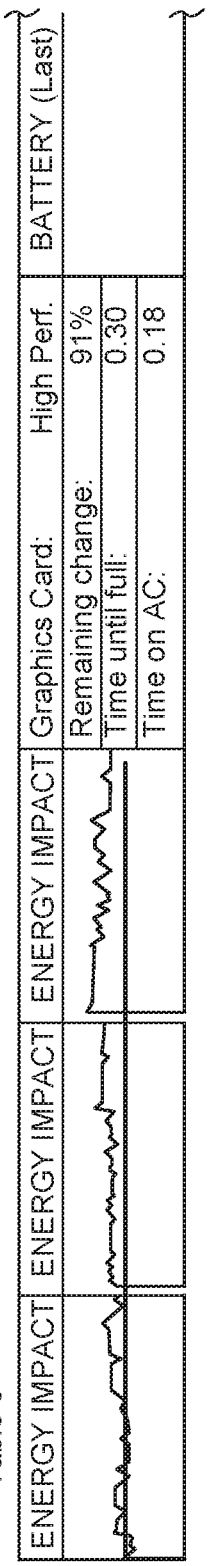
FIG. 10B shows Tables 6-8 illustrating the effect of certain actions on system resources.

According to another example, the planning system 712 determines different hourly rates for a service provider according to the cost of the service and based on the time horizon applicable to the event involving the service provider. For instance, the planning system 712 may determine that a massage appointment scheduled 6 months in advance receive a minimum rate, while a massage appointment scheduled 3 months in advance receive a rate that is a multiple of the cost associated with providing a massage, while a massage appointment scheduled for 2 months in advance receive a rate that is a standard hourly rate, while a massage appointment scheduled 1 week in advance receive a maximum rate, while a massage appointment scheduled 1 day in advance receive a rate that is a combination of the rates described above. An example process executed by the planning system 712 (FIG. 7) is illustrated in FIG. 9. In this example, the planning process 900 includes acts of forecasting events and time horizons, adjusting the forecast, generating schedule requests, and submitting schedule requests. Process 900 begins at 902.

In act 904, a planning system, such as the planning system 712 (FIG. 7) analyzes characteristics of historical events (e.g., event timing, attendees of the events, and prices paid for the events) to predict characteristics of future events. For example, the planning system may determine that some events repeat according to a regular pattern (e.g. daily, weekly, monthly, bimonthly, quarterly, biannually, annually, etc. . . . ). The planning system may present a forecast of future events that continue these historical patterns into the future. Further, the planning system may forecast attendees of the events of and prices paid for the events based on the attendees of and prices paid for the historical events.

In act 906, the planning system adjusts the forecast based on an economic strength factor. The economic strength factor may be a configurable parameter provided by a user or a parameter given by external and or global economic indicators via a system interface. In one embodiment, planning system multiplies one or more components of the forecast by the economic strength factor to determine an adjusted forecast. For example, the planning system may multiply forecast revenue generated by each event by the economic strength factor.

In act 908, the planning system generates scheduling requests with characteristics that comply with the adjusted forecast. In act 910, the planning system submits the generated scheduling requests to the scheduling system 100 (FIG. 7) in an attempt to implement the adjusted forecast generated in the act 906.

The planning process 900 ends at 912. Planning processes executed by the planning system 712 (FIG. 7) in accord with the planning process 900 forecast profitability and utilization using historical information tempered by user provided insight. In this way, processes in accord with planning process 900 enable service providers to improve profitability and smooth supply to existing or forecasted demand by proactively scheduling events according to a calculated optimization plan.

The systems and component illustrated in FIG. 7 may be arranged into to a variety of configurations. For example, in at least one embodiment, the monitoring component 714 and the planning system 712 are components included within the scheduling system 100. Thus the embodiments and examples disclosed herein are not limited to the particular configuration of components illustrated in FIG. 7.

In act 504, the scheduling system 100 (FIG. 1) identifies one or more characteristics of the suggested calendar entry to create. In some examples, the scheduling system 100 (FIG. 1) determines one or more characteristics of the calendar entry based on the one or more received user profiles and historical information associated therewith. In one example, previously defined calendar entries may be used to determine the characteristics of the suggested calendar entry. In this example, if a time slot identified in the request has been previously scheduled as Pilates, the scheduling system 100 (FIG. 1) will determine the characteristics based on the previously created Pilates calendar entry. In another example, the scheduling patterns of a user may be analyzed by the scheduling system 100 (FIG. 1). For instance, if the scheduling preferences 108 (FIG. 1) of a user profile indicate that a user is most likely to generate a Pilates calendar entry during weekday mornings, a request to schedule including a weekday morning timeslot may result in the scheduling system 100 determining characteristics for a suggested Pilates calendar entry. In another example, the scheduling patterns and identification of previously created calendar entries may be used in combination whenever advantageous. For example, if no previously created calendar entry exists in the requested time slot, scheduling patterns may be examined to determine what characteristics (e.g., a resource to reserve) should be identified for a suggested calendar entry. In another example, the characteristics of a product generated by a service (e.g., amount of sugar and dairy to include in a cup of coffee) are identified for the suggest calendar entry. Examples of these characteristics include product identifiers, order quantity, product preparer, and other product characteristics.

As discussed above with reference to FIG. 1, the plurality of characteristics may include one or more resources. In act 504, the scheduling system 100 (FIG. 1) may determine the availability of the one or more resources, and if one or more is determined to be unavailable, suggest alternate resources which may satisfy the scheduling request.

In one embodiment, the one or more received profiles are sub-profiles as described above with reference to FIGS. 1-4. In this embodiment, the sub-profile may provide additional, narrowed, characteristics that the scheduling system 100 may used in determining characteristics for a suggested calendar entry.

In at least one embodiment, information within the data store 104 (FIG. 1) associated with the requested time slot may indicate characteristics for the suggested calendar entry. For example, if a requested time slot includes a preference indicator, such as the preference indicator 244 discussed above in regards to FIG. 2, the preference indicator will assist the scheduling system 100 in identifying characteristics.

In another embodiment, the request to generate a suggested calendar entry is received in act 502 includes an identifier of an existing calendar entry to update. In this embodiment, the scheduling system 100 (FIG. 1) determines one or more characteristics to update in the existing calendar entry based on the one or more received user profiles, and the existing calendar entry. For example, if the request to schedule is the result of a user requesting to join a class or private group calendar entry, then the calendar entry will be updated accordingly. In this example, the calendar entry may be updated to include an additional reference to the requesting user's profile. Further, the calendar entry status indicator, such as the calendar entry status indicator 204 of FIG. 2 may be updated to visualize the change to the updated calendar entry.

In act 506, a calendar entry reserving one or more resources during the time slot is generated whole or in part based on the suggested calendar entry. In some embodiments, the one or more resources are tentatively reserved in the act 506, pending confirmation of the calendar entry by the user in act 508 below. The new calendar entry includes a reference to the one or more user profiles, the one or more resources, and a reference to the one or more time slots. In one example, the UI interface library 114 (FIG. 1) updates various UI components to include the new calendar entry. For example, the calendar-centric user interface 200 of FIG. 2 may be updated to include the generated calendar entry within the calendar frame 204 (FIG. 2). Particular examples of these various UI components are discussed above with reference to FIGS. 2-4. It is appreciated that the one or more resources referred to in the new calendar entry may include a product associated with the service (e.g., a cup of coffee prepared by a barista).

In act 508 the scheduling system 100 (FIG. 1) stores the created calendar entry in the data store 104. In various examples, the new calendar entry is associated with the one or more user profiles from the scheduling request received in act 502. In these examples, the generated calendar entry may be used by the scheduling system 100 (FIG. 1) to create future calendar entries. Also, within the act 508, the scheduling system 100 may take additional actions, such as requesting confirmation of the calendar entry, exchanging information with a point of sale system, such as the point of sale system 710 (FIG. 7), or processing payment for the schedule service and products associated therewith. This payment processing may involve interaction with one or more payments systems and may require confirmation of the calendar entry by the user. Examples of input that the scheduling system 100 may accept as confirmation include responding affirmatively to a prompt requesting confirmation (via text, voice, or any other communication medium) and signing into the scheduling system in response to a notification. Example of input that the scheduling system 100 may accept as denial of confirmation include responding negatively to a prompt requesting confirmation or expiration of a time out period after issuing a notification to the user.

The information exchanged with the point of sale system during execution of the act 508 may include any of the information stored in the data store 104 (FIG. 1) or otherwise processed by the scheduling system 100. For example, the scheduling system 100 (FIG. 1) may provide a suggested price, service identifier, service provider identifier, an identifier of a product produced by the service provider during while performing the service, any special instructions associated with the service, a time slot for the service, and the like. In some embodiments, the point of sale may use the information provided to populate data fields in the point of sale to speed entry of a transaction corresponding to the event. In these embodiments, a user may change the populated data fields and these changes may be transmitted to the scheduling system 100 (FIG. 1). Thus some embodiments provide for a bi-directional interface between the scheduling system and the point of sale system.

Process 500 ends at 508. Scheduling requests received by the scheduling system 100 (FIG. 1) in accord with process 500 enables a user to create one or more calendar entries based on characteristics associated with one or more user profiles. In this way, processes in accord with process 500 provide users with a streamlined way of creating calendar entries without having to manually enter characteristics based on intelligent decisions by the scheduling system 100.

Figure 8:
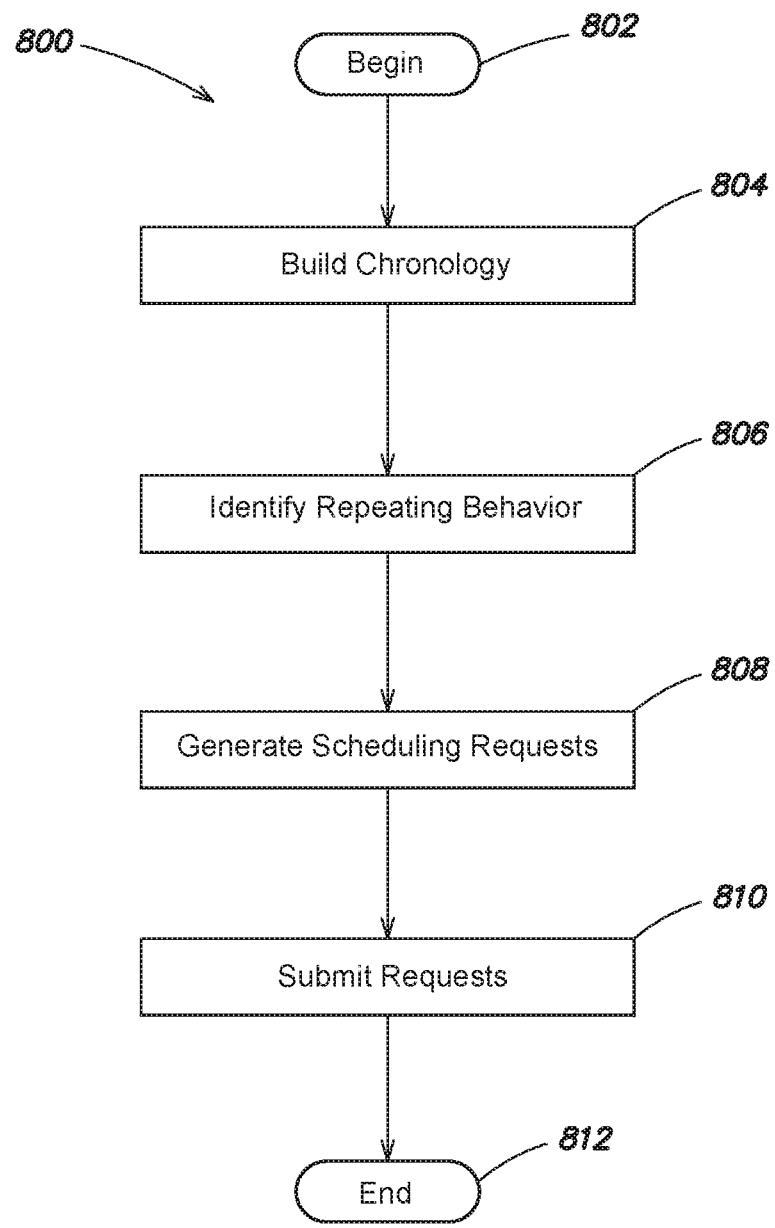
FIG. 8 is a flow diagram of a method for generating a schedule requests.

An example of a method implemented by the monitoring component 714 (FIG. 7) is illustrated in FIG. 8. In this example, the monitoring process 800 includes acts of building a chronology of user activity, receiving external data regarding user activity, identifying repeating behavior, generating schedule requests, and submitting the schedule requests. Process 800 begins at 802.

In act 802, a monitoring component, such as the monitoring component 714 (FIG. 7) builds a chronology of user behavior based on information collected by the monitoring component. In act 804, the monitoring component receives additional data from external systems that is descriptive of user behavior. In act 806, the monitoring component integrates the chronology and additional data to facilitate identification of repeating behavior performed by the user. The processes executed by the monitoring component may include various statistical processes, such as those described above used to discern schedule preference information 108 (FIG. 1). In act 808, the monitoring component generates and stores scheduling requests designed to streamline the identified, repeating behavior. In some embodiments, the monitoring component receives input from the user selecting or deselecting the generated and stored scheduling requests. In act 810, the monitoring component submits any selected requests to a scheduling system, such as the scheduling system 100 (FIG. 1).

Process 800 ends at 810. Scheduling requests received by the scheduling system 100 (FIG. 1) in accord with process 800 create one or more schedule requests based on a user's behavior patterns. In this way, processes in accord with process 800 provide users with a streamlined way of creating calendar entries without having to manually enter characteristics based on intelligent decisions by the scheduling system 100 (FIG. 1).

Each of the processes 500, 800, and 900 depicts one sequence of acts in a particular example. The acts included in the processes 500, 800, and 900 may be performed by, or using, one or more computer systems, such as the computer system 602 of FIG. 6. Some acts are optional and, as such, may be omitted in accord with one or more examples. Additionally, the order of the acts can be altered, or others acts can be added, without departing from the scope of the systems and methods disclosed herein. In addition, as discussed above, in at least one example, the acts are performed on a particular, specially configured machine, namely a computer system configured according to the examples disclosed herein.

In a number of embodiments, the suggested events and properties provided by the claimed systems and methods are enabled through the use of machine learning processes. Such events may include, for example, scheduling and forecasting events.

In some embodiments, each event and each of the associated identifiers, attributes, and characteristics for the event may, alone or in combination, comprise a feature that can be used to characterize the event. Each individual identifier may also comprise a feature. In one example, a time period from an event comprises a feature. In another example, a time feature from one event and an attendance level from another event are aggregated into a feature. It is not necessary that the features or identifiers are all contained within the scheduling system. For instance, the weather conditions on a particular date could be combined with the identifiers that are contained within a profile.

Each event and its associated features are stored individually, and may also be accumulated into one or more summary objects that are representations of events that have occurred in the past and may occur in the future. The resulting objects or combination of identifiers that make up possible suggested future events may or may not have occurred in the past. The features can be used as inputs to machine learning methods to predict the most likely successful acceptance of future events and associated identifiers or features.

The machine learning processes that rely on the previously mentioned identifiers, features, and or objects to provide suggestions for events or outputs are computer processor methods where the processor does not need or rely on additional human or manual input to continually improve on correlations between actual recorded events and models of events. Machine learning methods can then be used to improve the possibility of acceptance of a suggested event, including in cases where any particular combination of identifiers has not occurred but may be desirable based on known information about those identifiers or related identifiers. Each prior event, identifier, feature, and or object, becomes a data set that is used as training data by the machine learning method to reduce the predicted range between the suggestion (hypothesis) and actual historic events.

In some embodiments, the machine learning algorithms use supervised learning methods, where the processor is given a single or set of correct answers based on historical data (e.g., commodity prices in December). Those historic data sets become training sets for logistic, linear, and non-linear regression techniques that are implemented through iterative computational methods. The training set is used in an iterative computational method that can predict the outcome of future events to a high degree of probability. The algorithms often use statistical or analytical geometric methods to generate a model that is representative of future events.

The initial captured and stored event, identifier, attribute, or object becomes a basis for making suggestions for future events. Each additional event, identifier, attribute or feature becomes an additional training data set that is accumulated into the machine learning method. The processor and memory in combination record, store, and accumulate each historic event into the possible set of suggestions for a given profile as defined earlier. The accumulation of training data sets are used by the processor to continually and incrementally refine the predictions for acceptance of a suggested event or property.

These training data sets are accumulated in a number of forms. In some embodiments, they employ statistical methods where the processor learns by continually or regularly iterating over the known training data sets and including the latest, most recent training sets into the calculations to provide a refinement of the suggested events. In some embodiments, the statistical methods involve a regression of historic data against a predicted function for suggesting attributes for an event. The historic data may be used as training data or training sets. The regression may be linear or nonlinear, for example, polynomial, exponential, logarithmic, or other nonlinear regression technique.

In some embodiments, the regression is based on a least-squares method to minimize the error between the actual measured historic events and the suggested event. The least squares method can be implemented with algebraic methods and equivalent linear algebraic matrix methods as well as error minimization by first derivative calculus methods.

The general method takes the form of minimizing the distance between a hypothesis of a suggested event and the historic examples provided for the regression.

$$h_\theta(x_i) = C*(h_\theta(x_i) - y_\theta(x_i))^2$$

where $h_\theta(x_i)$ represents a function that is a solution for minimizing the error based on the value of theta ($\theta$) and across the set of known measured historic events is used to generate suggested events. In some embodiments, the solution to the equation is realized using the gradient descent method. In the method, an initial hypothesis is proposed as a value that minimizes the squared error between the hypotheses h(x) and the given value from a training set y(x). The processor then iteratively evaluates all of the training set data, measures the error, and adjusts the hypotheses until the error converges to zero or a minimum.

In other embodiments, a logistic regression can be performed where the data may be analyzed using classification methods. This include the Naïve Bayes method where all possible outcomes for the probability of an event are taken into account using the probability of the general form p(x|y)=p(x|y)*P(y)/p(x). This describes the probability of an event x given that the probability of y exists. This can be extended to any number of possible probabilities. A result is realized in an iterative fashion, and is updated as each additional training set is added to the historic accumulated set of events and associated features. Both gradient ascent and gradient descent methods can be used with the Naïve Bayes method. As with other machine learning methods, the machine learns without human assistance and the probability of the suggestion nearing history is far beyond what a person could achieve, certainly in the time frame required to efficiently schedule an event. The iterative methods used to minimize the error can also be implemented using a gradient descent method where A linear regression may be performed on a number of even attributes to be factored into the suggestions. In some embodiments, a proportional weighting factor may be applied that describes how much weight to assign to each event attribute. It is also important to note that the attributes do not have to be pre-defined for a given profile. As examples, a profile may not specifically include the fact that a client has never had an appointment with a male practitioner, or has never scheduled an event after 9:00 am, or has scheduled appointments for 6 different types of events over time but the profile does not include a favorite type or preference for a particular type of event. This is where the present systems and methods make possible a highly probable suggested event.

The machine learning aspects of the claimed systems and methods make it possible to provide scheduling suggestions that would otherwise be not feasible or impossible to a person attempting to do so mentally or with pen and paper. In particular, since there are often dozens of attributes attached to an event, the possible suggested events contain thousands of combinations. Selecting each attribute, or a combination of attributes, for each event is cumbersome or impossible to do in a reasonable time frame (such as the length of a phone call), especially considering the weight to attach to each attribute is also variable. The use of machine learning on aggregated features and attributes allows the claimed methods and systems to therefore improve upon existing computerized scheduling techniques.

Any number of features or attributes may be used, either alone or in combination, in the machine learning of the claimed systems and methods. Such features or attributes include: training machine number, Date, Day of week, Time of day to start, Specific Instructor preference, No specific instructor preference but instructor gender preference, Event goal, eg (cardio health, strength, weight loss), length of event, price is <$80, private session, group class, Location, Time, Availability for regularly recurring event, Season (indoor vs outdoor events, or long term absences/travel), Events with regular absences (do not schedule every third week), Is the date a holiday, Is the date in school vacation week, historic client satisfaction, facility utilization, client gender, age of client, new vs. continuing client, etc.

Since each profile may have a different weighting on each attribute, either specifically stated or often unstated but hidden in the large amount of data, the weighting may be adjusted for each attribute x. Thus, both the attributes and weights have to be evaluated in conjunction to arrive at the most probable solution, again, an impossible task to do by hand or mentally during the time span of a typical event scheduling session. The evaluation takes the form of minimizing the least squares distance between the function for the possible suggestions by minimizing the weighting value in the least squares distance between the suggested solution and the actual measured values.

The machine learning algorithms are computer learning methods of choosing the most important attributes $x_i$ and assigning the appropriate value to each weighting factor in order to choose the correct set of both pre-defined profile attributes and undefined but inherent event attributes that influence weighting factors. Each additional historic data set adds to the sum over the training data set and the algorithm becomes more accurate. The most probable solution corresponds to the point where the least-squares distance is a minimum.

Each event and associated features constitute a training set and each attribute has a varying degree of influence. As described earlier, event attributes often have scores of attributes, some deliberately defined in a profile and some which are learned as history is accumulated and placed into the training sets. The regressions can be both linear and non linear in nature. In the case of polynomial and non-linear regressions, the features can be represented as higher order functions of the feature.

Figure 11:
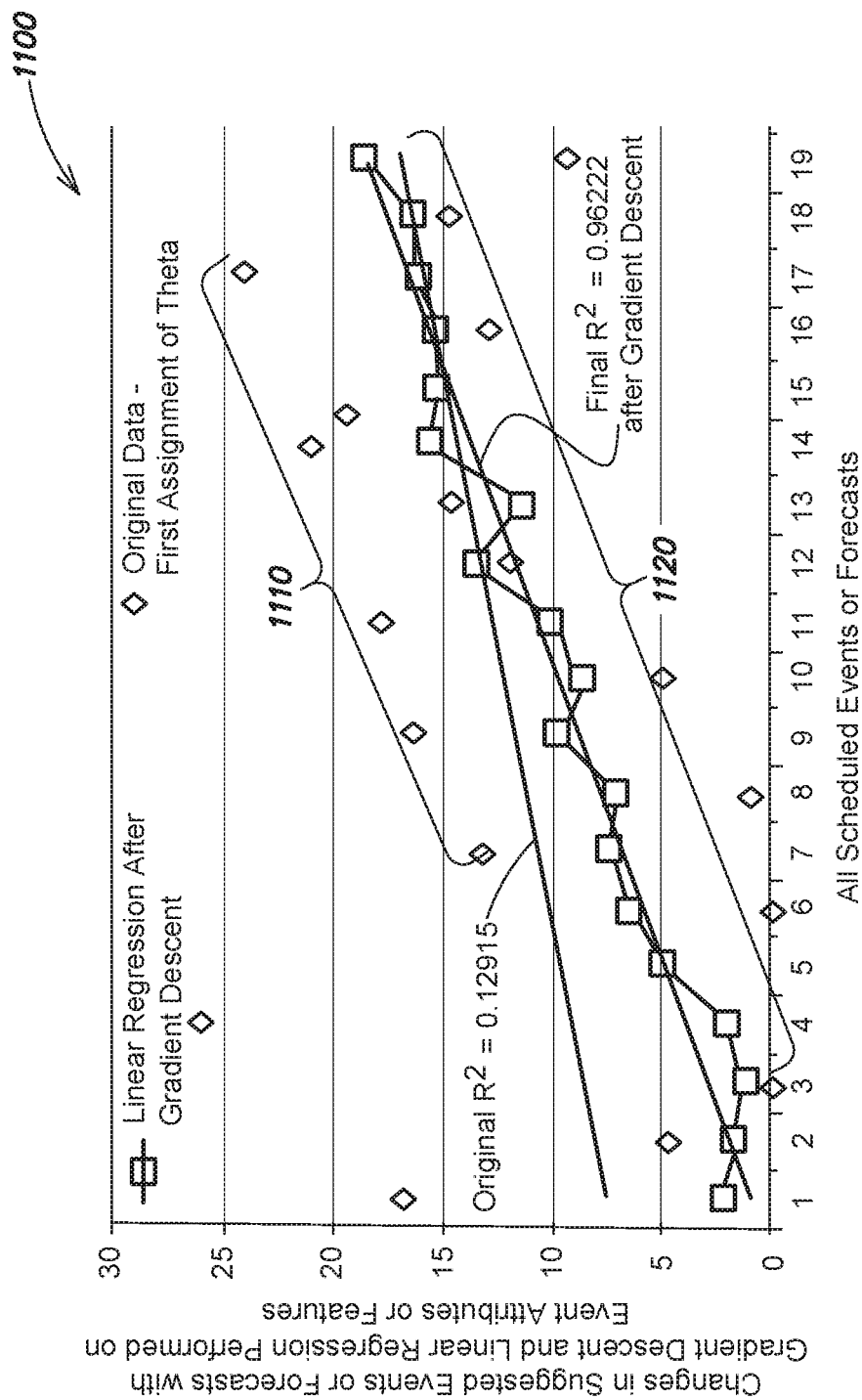
FIG. 11 illustrates exemplary data sets used in the claimed systems and methods.

The chart 1000 at FIG. 11 shows possible results for a machine learning gradient descent linear regression. The original data 1110 is widely scattered and has little correlation to any particular features. After applying the gradient descent learning algorithm, the correlation of the adjusted data 1120 is very high and can be used to effectively making scheduling suggestions.

In some embodiments, the minimum error function or cost function is called the normal equations method or Newton's method. The method makes use of the fact that the derivative of a function has a minimum which can be found by setting the derivative equal to 0 and solving the equation $$\partial/\partial J(\theta i) = 0$$

The cost function $J(\theta_j)$ is used in the process and the equation is solved for $\theta$. If the cost function is not of quadratic form, numerical methods must be used to solve it, and the gradient descent method allows the processor to efficiently provide the optimum suggested event or events.

In some embodiments, customer feedback may be a feature that affects a suggestion. In one example, a feature that affects a suggestion for scheduling an event is a positive customer experience based upon attendance utilization of an event. Events that are not at full capacity may have a higher satisfaction rate due to more personal attention. These features may not be pre-defined in a client's profile but are critical in successfully suggesting events and can be instantly done over historic training sets. The events could be suggested in decreasing order of probability.

It is not feasible for an employee who is scheduling a client during the course of a phone call to look at every future scheduled event to determine the currently scheduled attendance of every event, nor to be able to predict what the final attendance will be during the course of the call. These factors are both critical to suggesting the optimal schedule for an event. The claimed systems and methods provide the ability to quickly and accurately provide a suggestion based on availability of all future events and historic events taking satisfaction or attendance into account. It is also possible to quickly and accurately provide a suggested event when a feature is requested during the course of the scheduling phone call, such as the probability of being scheduled when on a waiting list.

In some embodiments, machine-learned suggestions are also provided when a client is self scheduling by logging directly into the hosts scheduling system. It is impossible for a guest to have enough information about all the features of all the potential future events, and the cumulative historic performance of those or similar events to make anything other than a random choice based on a minimal set of features. The profile of a client that is logged in to the scheduling system will provide a much higher probability of successfully suggesting an event when the profile and historic performance of the client are set as features in the claimed systems and methods. The issue of insufficient knowledge is exacerbated in the case of new or inexperienced clients. A high probability of satisfaction in a first or early event is crucial to the success of businesses.

Real time business performance and forecasts for all financial metrics can be greatly improved using machine learning algorithms including the gradient descent and regression, naïve Bayes with gradient ascent and Newton's method with gradient descent or a convergent algorithm, and neural networks, also with a convergent computational method. The forecast time horizons discussed in this document and associated ability to predict business performance and properly plan can be far more accurately understood using the claimed machine learning methods. The ability to take into account predicted attendance, utilization, cancellations, client satisfaction, labor scheduling, cost, inventory management are all far more accurately done by machine learning techniques. In some embodiments, the supervised learning algorithms such as regression, both linear and nonlinear as well as the Naïve Bayes methods are continually updated to real time predictions as each event is scheduled. It is not necessary that the data set all be a part of a single source. The ability to retrieve data from sources other than the primary feature set can be used in the machine learning solutions. An example could include using current or local weather or seasonality data as an input. The suggested events may be altered based on this variable external feature set. This real time data is an advantage in business decision making and it is unfeasible if not impossible for this real time data to be done without machine learning techniques.

In some embodiments, unsupervised learning techniques are also used in understanding the scheduling effects on business metrics such as forecasting, financial results, and customer experience. Unsupervised learning is based on pattern recognition where the correct answers are not provided in the historic data and the machine learning algorithms search for patterns without any guidance. It characteristically is performed on un-labeled and often unstructured data. Unsupervised learning techniques may also include iterative techniques based on computational convergence to a minimum. Unsupervised learning techniques can be applied to both scheduling tasks and the effects of scheduling on the business performance.

Applying similar gradient descent techniques to neural networks provides insight into hidden pattern in the scheduling and business performance realms. An unsupervised learning algorithm does not require the historic data to be categorized and is extremely valuable in finding hidden patterns across all events and across all features and find valuable patterns. The results would then become machine learning defined features that are literally invisible to humans and are not visible in pre-defined features that are defined by humans.

It will be appreciated that a number of additional machine learning algorithms and methods beyond those already discussed that can be used to provide optimum suggestions for scheduling events.

In some embodiments, suggestions may be made based on neural networks machine learning methods. Such numerical computational methods can be used for both supervised and unsupervised evaluation of features. Neural networks are simulations of the human brain where computational nodes represent neurons. The nodes are interconnected. Each node has inputs and outputs and each input is evaluated with a weighting factor. In some embodiments, the nodes may be "feed forward" nodes, where the decision process and output information flows in one direction. In other embodiments, a fully recurrent network is provided where the information flow between nodes can be bidirectional; that is, information can flow from a parent node to a child node or from a child node to a parent node.

In some embodiments, the claimed systems and method employ a class of machine learning methods and algorithms known as deep learning, in which the modeling is complex and often multi-tiered. A problem may be solved by using nonlinear transformations to map a feature set or feature sub-set into a representative space as part of the analysis. These methods sometimes use vector representations of the data set and linear algebra matrix methods are used as a part of the computational process.

As with other machine learning algorithms, the functions that can be applied to the inputs can take many forms. The same gradient descent algorithms can be applied to the neural network functions where a weighting factor for each input and a learning rate can be iteratively applied until the defined cost or error function converges to a minimum. That function can then be used to provide the highest probability suggestions.

It will be appreciated that the discussion relating to any of event features, event identifiers, and attributes may be applicable to each of those elements. Similarly, discussion relating to any of cost function, error function and loss function may be applicable to each of those elements.

Computer System

As discussed above with regard to FIG. 1, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Referring to FIG. 6, there is illustrated a block diagram of a distributed computer system 600, in which various aspects and functions are practiced. As shown, the distributed computer system 600 includes one more computer systems that exchange information. More specifically, the distributed computer system 600 includes computer systems 602, 604 and 606. As shown, the computer systems 602, 604 and 606 are interconnected by, and may exchange data through, a communication network 608. The network 608 may include any communication network through which computer systems may exchange data. To exchange data using the network 608, the computer systems 602, 604 and 606 and the network 608 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 602, 604 and 606 may transmit data via the network 608 using a variety of security measures including, for example, TLS, SSL or VPN. While the distributed computer system 600 illustrates three networked computer systems, the distributed computer system 600 is not so limited and may include any number of computer systems and computing devices, networked using any medium and communication protocol.

As illustrated in FIG. 6, the computer system 602 includes a processor 610, a memory 612, an interconnection element 614, an interface 616 and data storage element 618. To implement at least some of the aspects, functions and processes disclosed herein, the processor 610 performs a series of instructions that result in manipulated data. The processor 610 may be any type of processor, multiprocessor or controller. Some example processors include commercially available processors such as an Intel Xeon, Itanium, Core, Celeron, or Pentium processor, an AMD Opteron processor, an Apple A4 or A5 processor, a Sun UltraSPARC or IBM Power5+ processor and an IBM mainframe chip. The processor 610 is connected to other system components, including one or more memory devices 612, by the interconnection element 614.

The memory 612 stores programs and data during operation of the computer system 602. Thus, the memory 612 may be a relatively high performance, volatile, random access memory such as a dynamic random access memory ("DRAM") or static memory ("SRAM"). However, the memory 612 may include any device for storing data, such as a disk drive or other nonvolatile storage device. Various examples may organize the memory 612 into particularized and, in some cases, unique structures to perform the functions disclosed herein. These data structures may be sized and organized to store values for particular data and types of data.

Components of the computer system 602 are coupled by an interconnection element such as the interconnection element 614. The interconnection element 614 may include one or more physical busses, for example, busses between components that are integrated within a same machine, but may include any communication coupling between system elements including specialized or standard computing bus technologies such as IDE, SCSI, PCI and InfiniBand. The interconnection element 614 enables communications, such as data and instructions, to be exchanged between system components of the computer system 602.

The computer system 602 also includes one or more interface devices 616 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, global positioning system chip sets, etc. Interface devices allow the computer system 602 to exchange information and to communicate with external entities, such as users and other systems.

The data storage element 618 includes a computer readable and writeable nonvolatile, or non-transitory, data storage medium in which instructions are stored that define a program or other object that is executed by the processor 610. The data storage element 618 also may include information that is recorded, on or in, the medium, and that is processed by the processor 610 during execution of the program. More specifically, the information may be stored in one or more data structures specifically configured to conserve storage space or increase data exchange performance. The instructions may be persistently stored as encoded signals, and the instructions may cause the processor 610 to perform any of the functions described herein. The medium may, for example, be optical disk, magnetic disk or flash memory, among others. In operation, the processor 610 or some other controller causes data to be read from the nonvolatile recording medium into another memory, such as the memory 612, that allows for faster access to the information by the processor 610 than does the storage medium included in the data storage element 618. The memory may be located in the data storage element 618 or in the memory 612, however, the processor 610 manipulates the data within the memory, and then copies the data to the storage medium associated with the data storage element 618 after processing is completed. A variety of components may manage data movement between the storage medium and other memory elements and examples are not limited to particular data management components. Further, examples are not limited to a particular memory system or data storage system.

Although the computer system 602 is shown by way of example as one type of computer system upon which various aspects and functions may be practiced, aspects and functions are not limited to being implemented on the computer system 602 as shown in FIG. 6. Various aspects and functions may be practiced on one or more computers having a different architectures or components than that shown in FIG. 6. For instance, the computer system 602 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 602 may be a computer system including an operating system that manages at least a portion of the hardware elements included in the computer system 602. In some examples, a processor or controller, such as the processor 610, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system or an iOS operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 610 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language may be used. Accordingly, the functional components disclosed herein may include a wide variety of elements, e.g. specialized hardware, executable code, data structures or objects, which are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Additional Embodiments

According to some embodiments, a behaviorally informed scheduling process executed by a scheduling system, such as the scheduling system 100 (FIG. 1), begins with receipt of a client's name by the scheduling system. Responsive to receipt of the client's name, the scheduling system uses the information saved in the client profile to generate characteristics of a suggested appointment (also referred to herein as a suggested calendar entry) that is most likely fulfill the client needs. In some embodiments, the scheduling system suggests at least one suggested start time on a specific date or day of the week for an appointment type at a specific location. The scheduling system may also suggest either a duration, or an end time for the appointment. In these embodiments, the scheduling system assesses the facility resources (as recorded in the data store 104) to insure that there is available equipment if any is required for the appointment type, and assesses whether sufficient logical space is present for the service to be performed. For instance, where a redundancy of equipment exists in the facility, the scheduling system may reserve a preferred piece of equipment. For example, in the case of scheduling a Pilates class, the scheduling system may generate and store information representative of a reservation of Reformer #2 for the appointment.

In some situations, there may be multiple suggested appointments with optional characteristics that are less likely to appeal to the client based upon availability of any of the required characteristics or assets. In some embodiments, the scheduling system displays or presents these alternative appointments in decreasing order of relevance to the client. Further, in these embodiments, the scheduling system provides a visual representation of the appointment and all its associated characteristics that may be dragged and dropped onto a traditional calendar time slot. In other embodiments, the scheduling system places the appointment in the time slot in response to a simple selection of the preferred suggestion. The scheduling system may remove all of the resources that are associated with the appointment from availability for scheduling with other users.

In other situations, one or more resources may not be available for a particular appointment. For instance, a practitioner may be available at a given hour on a given day, yet there is no equipment available for the appointment type. To address these situations, some embodiments tentatively schedule the appointments without all of the characteristics and allow the user to over ride of any one of the characteristics by selecting the appointment. In these embodiments, the scheduling system requires confirmation by the user when over riding a required characteristic. In some embodiments, the suggested appointments are presented to the user in a color coded format or geometric format that differs from the suggested appointment where all of the preferences are met. In other embodiments, the scheduling system presents tentatively scheduled appointments in a different area of the display that is segmented from the area displaying appointments having all characteristics satisfied.

In some embodiments, the scheduling system is configured to present suggestions for products that are associated with the client or guest visit. In these embodiments, the scheduling system schedules these products in the same sequence as the appointment relative to the client arrival or departure time. The scheduling system accounts for the availability of products and processing preparation cycle time for each product when scheduling the product preparation. In the example of a smoothie which takes six minutes to prepare, and is requested to be ready upon the departure time, the scheduling system would generate a request to the production schedule in the smoothie bar to have the smoothie prepared six minutes prior to the end of the appointment. The scheduling system next processes payment for the service through the coupled POS system either from a payment method stored in the client profile or a physical payment by the client at the time of arrival or departure. Next, the scheduling system adds information describing the appointment to the profile of the client in the data store. This information includes each and every characteristics and attribute that is recorded as part of the scheduling process and is associated with information that is generated by the completion of the scheduled appointment.

In some embodiments, the characteristics and attributes that are recorded and stored in the data store include but are not limited to the following: all time horizons associated with the suggested appointments, client name, appointment type, location, day and date, start time, duration, completion time, reserved logical space or equipment, logical space or equipment preferred by the client, price at time of schedule, price changes that are subsequently made at any time including at time of check out, date and time that the appointment is scheduled, time horizon between the date and time of schedule and the date and time of the appointment, all changes to appointment types and date and time of change, additions or subtractions of clients for shared instructors and the names of each client that is added or removed from the scheduled appointment, other suggested appointments that were declined or not selected at the time of scheduling, all products including prepared foods that were scheduled and prepared in conjunction with the scheduled appointment, payment type and payment information required to complete the payment transaction, cancellations of scheduled appointments, day, date, and time of cancellation, time horizon between cancellation and scheduled appointment, number and type of other independent appointments scheduled concurrently and all of the associated characteristics and attributes contained in this list that are related to those appointments, name of person or third party website which requested the suggested appointment, price discounts that are offered as a result of booking through a third party or commissions that are paid to the scheduling party including third party web sites, names of additional clients that have a history of accepting appointments at the same time and day, or date as the accepted suggested schedule, a list of clients who also are candidates for the suggested time slot where one or more overlapping attributes that may render a suggested time slot unavailable to them, and where a waiting list is generated based upon the afore mentioned list, a record of clients that ultimately are scheduled from a waiting list, any promotions both discounted or full priced, that were offered to the client and the method that was used to offer the promotion including email, text, voice call, web site or system reminders, the time horizon between the promotional offer, and the generation of the suggested time slot, the allowable booking horizon prior to the scheduled suggested time slot that is maintained in the system, the physical location of the user relative to the location where the product or service is to be rendered, any network or user device profiles needed for scheduling, any exceptions to the scheduled event where a history of appointments contain an exception to any one or more of the attributes mentioned above, any additions to the scheduled event and the associated changes in duration or end time. In some embodiments, an appointment with all the usual attributes with the exception of a change in start time on a given day may constitute an exception.

In other embodiments, any information pertaining to the practitioner including but not limited to payroll, compensation, start time and duration of service provided by the practitioner and record of service type provided by a practitioner, total hours the practitioner is available for the day and date of the service as well as the previously accepted suggested scheduled or unavailable hours for the practitioner is stored in the profile of the practitioner which resides in the system memory. The accumulated stored data from all the appointments both from suggested scheduled time slots and those not booked from suggestions are stored in a the data store and associated with a profile of the business or particular business segment relative to the scheduled events. The accumulated data can be combined or stored separately. The accumulated data for each client and all of the practitioners may also be stored. The data for all of these contributors is stored in the data store in an accessible, searchable database format and is used to generate the analytical business management suggestions and reporting functions disclosed herein.

Upon completion of the appointment, any additional charges or fees that are stored in the user profile are applied and payment is applied using either the user payment information stored in the user profile or a different payment method supplied by the user. Examples of additional charges or fees are premiums charged for selected or requested practitioners, or additional products used as part of the appointment or incremental services that are added into the appointment. The payment is processed through the coupled POS system.

According to some embodiments, shared appointments are different than classes. At least one difference being that classes occur at regularly scheduled times on any given day or date and are open to enrollment, while shared appointments are specifically scheduled based on client specific demand based on some of the calendar entry characteristics described herein. In at least one embodiment, the process for scheduling an appointment with multiple clients sharing a single practitioner is the same as the process for scheduling a class with the following exceptions. The value of the calendar entry characteristics is set to the nomenclature for a shared appointment such as a two person appointment or a three person appointment, and the additional client is included in the calendar entry. The preferred characteristics of each client are applied to the scheduled appointment. Once the suggestion is accepted and all the required resources are removed from scheduling availability. Each client is scheduled as an independent entity such that either one may be removed from the calendar entry. When removing a single client from the shared appointment, the scheduling system returns the resources reserved on behalf of the single client to the pool of resources availability for scheduling and modifies any prices and appointment types applicable to the remaining client.

In some embodiments, when modifying an appointment type of a scheduled single appointment to a shared appointment or increasing the number of clients sharing a shared appointment, the scheduling system automatically modifies the characteristics of all the appointment to match the modified appointment type and pricing. In these embodiments, the scheduling system also provides a suggested list of clients to add to the newly available appointment. Selecting a suggested client may schedule the new client for a shared appointment and may reserve any resources that are preferred according to the newly scheduled client's profile, including equipment, where all the client profiles associated with the shared appointment agree. Where the scheduling system detects a conflict between the preferences of the clients sharing the shared appointment, the scheduling system may prompt a user for input that resolves the conflict. An example of modifying an appointment type includes changing a Pilates session to a Duet from a Single which may change the pricing to the appropriate shared level and generate a list of people that have a history of participating in a duet with the currently scheduled client. Selecting that client may reserve the adjacent Reformer, if available and place the client name in the scheduled appointment. In one embodiment the scheduling system can automatically populate the calendar slot with a suggested second user and any or all required sub-profiles. As with all appointments, upon completion, payment may be applied from the profile and the characteristics of the appointments may be stored in the user profiles. All the characteristics of the scheduled appointment are also stored in the data store and associated with a business profile in the system memory for reporting and business management use.

Table 9 lists data elements (e.g., characteristics) of an example primary suggested appointment.

TABLE 9

| Field | Value |
| --- | --- |
| Clients | Natalie |
| Service | Pilates session |
| Date | Jun. 6, 2014 |
| Time | 8:00 AM |
| Duration | 1 hour |
| Instructor | Morgan |
| Equipment | Reserve Reformer #3 |
| Associated Product | Protein Smoothie |
| Product Pick-up Time | 9:10 AM |

Table 10 lists data elements included in an example alternative suggested appointment.

TABLE 10

| Field | Value |
| --- | --- |
| Clients | Natalie |
| Service | Pilates session |
| Date | Jun. 6, 2014 |
| Time | 8:00 AM |
| Duration | 1.5 hours |
| Instructor | Morgan |
| Equipment | Reserve Reformer #3 |
| Associated Product | Carrot Smoothie |
| Product Pick-up Time | 9:40 AM |

Table 11 lists data elements included in another example alternative suggested appointment.

TABLE 11

| Field | Value |
| --- | --- |
| Clients | Natalie & Lily |
| Service | Pilates duet session |
| Date | Jun. 6, 2014 |
| Time | 8:00 AM |
| Duration | 1.5 hour |

TABLE 11-continued

| Field | Value |
| --- | --- |
| Instructor | Morgan |
| Equipment | Reserve Reformer #3 for Natalie |
|  | Reserve Reformer #4 for Lily |
| Associated Product | Carrot Smoothie for Natalie |
| Product Pick-up Time | 10:30 AM |

Table 12 lists data elements included in another example alternative suggested appointment.

TABLE 12

| Field | Value |
| --- | --- |
| Clients | Natalie |
| Service | Pilates duet session |
| Date | Jun. 6, 2014 |
| Time | 9:00 AM |
| Duration | 1.5 hour |
| Instructor | Morgan |
| Equipment | Reserve Reformer #2 for Natalie |
|  | Reserve Reformer #4 for Lily |
| Associated Product | Carrot Smoothie for Natalie |
| Product Pick-up Time | 10:40 AM |

The computer systems used during planning and reporting (e.g., 600, 712) as described herein can be made significantly more efficient through the use of profiles that contain information that each user requires. Each report may be associated with a profile that contains the field information contained within each report. The reports may be configurable where there is a kernel of basic fields in the report. Additional fields can be selected to expand the number of fields within the report. Examples of additional fields for a sales report include quantity, vendor, product, color, gross margin, SKU, inventory turns, client name, client service sale date, sale time. Combining multiple traditional reports as used in currently available systems, into a single custom report reduces the number of CPU, memory, storage, and network cycles required, thereby dramatically reducing computing cycles from the named components. It also reduces network data traffic required for distributed or hybrid systems. A single snapshot report such as that in the example can reduce data required from approximately 28 MB in the examples and plots provided to 1 to 3 MB due to the redundant information contained in traditional reports. The configured reports can be stored in the user profile and favorite reports can be called from the users most often used pages as well as a reports page. They can also be call from all the system pages if desired.

In some embodiments, providing user access to client profile information that is currently in the cache (e.g., most recently selected or viewed) for both scheduling and reporting purposes from every user interface screen or page within the scheduling system can also dramatically reduce computing resources required. The ability to link to a client's profile including upcoming schedule, account information, purchase or visit history can also reduce the need to navigate to specific pages to view profile information, again reducing CPU, memory, storage, and network usage. Current systems require the use of multiple display modules to set prices requiring both additional computational cycles and network bandwidth to adjust and store prices in the storage. As described herein, an array of prices associated with each individual product or service type or a spot price based on history or current market conditions can be stored as part of the product or service profile including but not limited to time difference and available capacity. The suggested price association could be automatically displayed at the time of booking, again reducing CPU usage, memory and network bandwidth compared to multiple manual cycles required to adjust prices manually or select a virtually identical similar product or service with the main difference being the price. An example of this would be a massage where the profile would require multiple sub-profiles associated with it and stored separately, each with separate names or identifiers. They also require manual selection. In the case of profile based system, a single profile can have the suggested price automatically inserted using the best suggested price based on the inputs to the accumulated profile. Additionally, available prices derived from history can automatically be displayed or offered at the time of scheduling.

In some embodiments, the system varies prices based upon the period associated with an advance booking and optimization of revenue and margin can be optimized by insuring a minimum breakeven utilization while varying the price as the event time approaches. These prices can vary either up or down.

In some embodiments, a cursor is placed on a business asset or resource at an available time slot or a list of available time slots. Related services, products, instructors, practitioners specific equipment along with other required resources and information about the service are displayed in various sequences via entry fields, drop down menus or other means of display once a time is selected or hovered over. The additional multiple attributes can then be selected or ignored sequentially by again placing the cursor on the other attribute selectors and inserting them into the appointment type. These other attributes typically often include:
 a particular service type
 a particular appointment length
 a particular service provider or instructor
 a particular type of equipment or space
 a favored spot or particular required or favored piece of equipment for the service
 a desired day of the week
 a favorite time of day
 a particular recurring pattern
 a particular physical location for the service to be offered
 a particular product or set of products
 the number of people to be scheduled for the time slot and associated resources for those people
 associated clients, products or services including additions or omissions from a standard scheduled event
 food products that are associated with a scheduled appointment including breakfast or lunch smoothies or salads.

In some embodiments, lack of action including exceptions to behavior or "Null Sets" contain valuable and actionable information. These appointments also often have client preferences where there can be an exception to their preferred scheduled time. These exceptions include client schedule, capacity restrictions, price preferences, or other additional restriction requirements often occur during limited periods due to regular travel, work, vacation home visits, and numerous other reasons. They often also include price reductions where their preferences are altered in the event of lower prices and promotions. In cases like these, there are attributes that need to be accounted for:
 Some of these attributes are exceptions that typically have to be manually adjusted or removed after a series of appointments has been scheduled. Again, in conventional systems, the exception process is managed manually where those appointments are manually removed or omitted from any scheduling process, often at the last minute.

Another of these attributes is a time horizon associated with the period between the scheduling time and date and the scheduled event time and date. These time horizons which can vary from seconds and minutes to hours, days, months, and years, and scheduling exceptions also often vary based upon several factors including but not limited to:
 Studio or venue policy of allowable advance booking
 Behavior of the client
 Variation in pricing based upon the horizon
 Utilization and or availability of equipment
 Utilization and or availability of practitioners
 Cancellations of previously scheduled appointments
 Newly opened capacity
 Newly offered products or services
 Special promotional pricing or service offerings including those offered for sale by third parties, sometimes comprised of mass buying power web sites, where the scheduled service is fulfilled by the local venue.
 Promotions such as a "deal of the day" offered through proprietary or third party websites or alternative channels,
 The method of booking, ie online or over phone
 The seasonality of the products or services
 There are also life events in client's lives that often act as a trigger for scheduling an event such as a massage, a facial, a dinner, a spa day, etcetera.
 These events often come in the form of:
 Birthdays
 anniversaries,
 annual or repeat vacations or trips to a regular location,
 regularly scheduled business trips,
 seasonal housing or seasonal residency,
 return to college or residency school
 return from college.

These events can also be taken into account in order to efficiently schedule clients.

In some embodiments, behavioral and exception based scheduling and management systems present a suggested schedule for a product or service that takes into account the behavior and exceptions in order to present a list of preferred products or services which have a high likelihood of meeting the behavioral and, or exceptional needs of the client based on the accumulated history, or documented preferences.

In some embodiments, the order of display can be modified to optimize for the behavior of the client and the needs of the business. For instance, the suggested services can be displayed in declining order of relevance based upon the historic attributes of the client. These attributes can present availability directly adjacent to on either side of a service type of a preferred scheduled time and day if their preferred scheduled time is not available. It can also do a declining display based on one-sided preferences, such as declining relevance earlier in the day than their typical appointment or later in the day than their typical appointment. The suggested appointment can be directly adjacent to the preferred time or can include a dramatically modified time such as an afternoon or evening as opposed to a typically historic morning appointment if an exception, such as a conflict with their regularly scheduled appointment, is invoked in their regularly scheduled appointment. This invocation can take the form of a cancellation request or a re-schedule request. These exceptions can also take the form of a regularly scheduled appointment each week, except for a particular week of the month. They can also take the form of a regularly scheduled time of day with an exception that occurs at a different time of day on any given day or week of the month. These alternative appointment suggestions can also be based on a preferred and declining order of relevance to any of the learned or historic attributes of the appointment or likelihood of acceptance based on history or a documented profile.

In some embodiments, acceptance of the suggested product or service can also automatically manage any required operational changes with regard to available capacity, billing and payment, account management, associated financial accounting within the scheduling system and automatic changes to available pricing or scheduling time horizons.

In some embodiments, once all these appropriate attributes have been selected, the appointment is booked, sometimes without taking payment and sometimes while taking payment at the booking time. The operational attributes of the scheduled event may be adjusted along with any changes that are scheduled. These operational attributes include making the service provider or practitioner unavailable along with any physical resources that are required. The adjustments may also include recording any changes that are required including but not limited to:

available units remaining at relevant pricing levels
payroll requirements associated with the scheduled event
service provider pay attributes
Management reports and notification of scheduled event and recommendations Management and Reporting The acceptances or rejections of the suggested appointments may be processed by the embodiments disclosed herein. The acceptances or rejections may be relevant to business management in that they can monitor the effectiveness of the strategies and policies in place. In some embodiments, this accumulated history in turn also can be presented to the management in an internal manner via the reporting mentioned earlier and suggest changes to the pricing policies and programs, both time horizon related and what can be considered base or standard pricing. Suggested appointments can be based upon return on investment using factors such as utilization, pricing, and materials and labor cost such as practitioner wages and overheads associated with each relevant activity, product, product class or scheduled event. In some embodiments, this reporting can be manually generated or automatically generated, triggered by events within the operation that are related to relevant business metrics. Those metrics include equipment utilization, facility utilization, employee utilization, and any metrics of profitability including gross margin, operating margin, and contribution margin.

In some embodiments, these reports can also be presented in a declining order of relevance based upon the historic effect on utilization, profitability or return on capital investment.

Reporting

It is also imperative that managers of the business have a very accurate view of how the pricing, facility utilization and scheduling, and costs are affecting their business and profitability so simple effective and the most relevant reporting on a regular basis with simple access and is required. Using scheduling histories including forecasted scheduling and the Time Horizons implemented in the system provide the ability to automatically or manually optimize financial goals and metrics by making real time policy changes with a minimum of human and computing resources regarding, pricing changes, and promotional changes, and some or all management decisions via reporting mechanisms as feedback loops.

In some embodiments, the acceptances or rejections of the suggested appointments are recorded as these acceptance or rejections can also be relevant to the business management in that it can monitor the effectiveness of the strategies and policies in place. This history of cumulative suggested appointment outcomes in turn also can be presented to the management in an internal manner via the reporting mentioned earlier and suggest changes to the policies and programs. These suggestions can be based upon return on investment based on utilization, pricing, and materials and labor cost such as practitioner wages.

In some embodiments, the available reports can also be presented in a declining order of relevance based upon the historic effect on utilization, profitability or return on capital investment and allow the management to immediately adjust to any changes.

Reporting and Feedback to the Operation

Some embodiment manifest an appreciation that reporting for scheduling is critical since ultimately, the only reason to provide reports is to provide actionable information. Thus, some embodiments implement simple, clear, actionable reports that are critical to effective and beneficial scheduling. The ability to incorporate the results of scheduling activities into real time or cached actionable reports enhances the customer experience and optimizes the business metrics by matching the needs of both. Elements of the various reports that can be used to immediately or latently suggest an optimal or acceptable scheduling solution to both the business and the client range from reporting any combination of: the day, date, start time and end time, product, service, person in the form of practitioner—service provider—product preparer, and or instructor, price, cost, ROIC, profit, operating margin, gross margin, contribution margin, cash flow, booking time horizon, pricing with or without relation to time horizon, exceptions to the scheduling, and or related price, quantity, or availability considerations. Any one result or combination of the results of the reported scheduled events can be used as a feedback to make adjustment to the suggested appointment schedules and pricing. The reports are not only to be used by people to make changes to the business strategy and policies but can be allowed to be adapted by the processor based on the needs of all parties involved. These reports can be akin to artificial intelligence where the processor determines the best outcome of scheduling.

Access to Reports and Display of Available Reports.

In some embodiments, reporting for managers takes many forms including reviewing the operation as part of a regular performance review process as well as real time evaluation of any metrics relevant to immediate activities by any and all staff including users, schedulers, and management staff. It is essential to provide access to relevant reports and while multiple reports are required to effectively operate a business, there is often a small subset of real time reports that can be made available to the user or manager that is dependent on the particular view of the scheduling module. Again, historic profiles can be used in this process and all reports can be exported from the scheduling system into a text file, a CSV file format, a character delimited file format, or a spreadsheet file such as Excel or Numbers. The reports are stored in a user, management, or system profile and the processor can determine which reports are most relevant to the current system display view.

In some embodiments, reports are displayed as a set of favorite reports where the most often used reports are presented in descending order in the display of the scheduling system. These favorites can be displayed in descending order of usage or relevance based upon the profile of the user, or the particular system screen that is being displayed at the time. They can to also be displayed alphabetically.

In some embodiments, in the case of viewing reports from a system display view where reports are the primary information sets displayed, it is much more efficient to be able to access all reports or favorite reports both from the main report view selection page or tab and also access other reports directly from any from any report page that is shown in the current view thus eliminating the need to return to the main reports page to view additional reports and is much more efficient.

Some embodiments manifest an appreciation that accessing individual client information reports is also critical for real time viewing and real time client management. In these embodiment, reports for individual client information such as past visits, future scheduled visits, payment history, and client profile information, are accessible from every system display screen. Any restrictions to client information access can be managed via the user profile. In order to minimize display space consumption, client information reports can contain all the information in the profile and further configurable from the screen based upon the user and or the system screen display that the report is being sourced from.

Forecasting, Reporting, Business Management, and Time Horizons.

Scheduling future clients has a material impact on the performance of any business. It is also computationally complex and requires numerous computing cycles in traditional forecasting in currently available systems. Using historic business profiles can dramatically simplify the process, again resulting in reduced computing cycles as described earlier, and reduced network usage requirements. In some embodiments, the length of advance notice time of the scheduling of the product or service and the manner of scheduling or ordering are characteristics of the scheduling process that impact the price since remaining capacity are directly affected each time scheduling process occurs. The performance of any business is therefore inexorably linked to both the demand curve for a given product or service and the time and manner that the service is scheduled or the product is ordered. Time horizons, or the difference in time between two events are critical to forecasting and making real time adjustments to business policies including price and capacity management. There are a number of time horizons that are relevant to this scheduling process that are disclosed for this system. Each of these time horizons are stored a profile in the system memory. Each time horizon can be stored as an individual profile or as a larger profile for the company or a segment of the company. They are listed below.

The difference between the time that the suggestion is presented and the time that it is evaluated and accepted or rejected.

The difference between the time that the suggestion is evaluated and the start time of the scheduled event.

The difference between the suggested event, and the time that the suggestion is evaluated and accepted or rejected.

The difference between the acceptance of a suggestion and the start time of the suggested scheduled event The time difference between the time of an acceptance of a suggested time slot and the time that any modifications or cancellations are made The time difference between the time that any modifications or changes are made to a previously scheduled time slot and the start time of the modified scheduled time slot.

The time horizon between the time that capacity utilization is measured by the processor and reported, and any the relevant date of any given financial metrics time horizon or any arbitrary day, date, and time that is input by the user. Financial metrics in this case can be daily, weekly monthly or annual reporting for both historic periods and forecasted periods. Arbitrary periods can allow the user to set the end period relative to the time horizon.

The time horizon for walk-in users or immediate scheduling.

Compound time horizons are combinations in any manner of the disclosed time horizons.

In some embodiments, the profile of any or all of the historic time horizons that are stored in the memory, relative to the time that the company or sub set of the company achieves a given financial or operational metric is stored in memory. These profiles are used to establish relationships to financial and operational metrics including but not limited to Financial Breakeven, Return on Sales, Operating Margin, Gross Margin, Contribution Margin, Revenue, Return on Invested Capital (ROIC or ROC), utilization of the practitioners in aggregate, utilization of the facility in aggregate, utilization of each individual instructor as a percentage of both total or facility available daily calendar hours and as a percentage of the individual instructors total availability measured in hours across days, weeks, months, or years, the pricing profiles of each practitioner as a standard or if they differ from the standard for any reason, or the predicted Revenue Curves where each of the financial metrics are consistent with GAAP standards if possible. Revenue Curves are defined as the product of slope of the demand curve with volume applied across all available volumes, i.e. ($\partial$ Price/$\partial$ Volume)*Volume, applied from zero units to the total available units in any market. The correlation by the processor of any operational or financial results using either a single time horizon or using compound time horizons disclosed in this document can be used to improve the predictive accuracy of financial and operational performance and the results can therefore be used to improve the operational or financial results. Each of the relationships described herein can be performed with or without correlated relationships to the Demand Curve in a predictive manner to estimate forecasts or for historic reporting purposes. In some embodiments, these historic correlations can be fed back to automatically modify pricing, availability and promotional activity which can be stored in the memory and presented via any of the sales channels described in this document. The processor can also use the results of the time horizon correlations to generate management information to be stored in memory for reporting purposes and the changes to pricing, availability, and promotional activity can be manually modified by a user or a manager. These relationships can all be used to populate the fields that are required for a "deal of the day" module where the deal is a special promotion that is made available through an integrated module either with the POS system and, or the scheduling system, or a combination of the two.

Each of the time horizons has a historic profile stored in the system. A history of all the prices quoted or charged associated with each of these time horizons is stored in the profile in the memory and a history of the quantity of appointments scheduled at each of these horizons is stored in each profile in the memory. The history can also be stored in a more comprehensive company, business segment, location, product, or appointment type profile.

In some embodiments, at least some of the financial metrics are calculated both from historic data, forecasted data, or a combination of the two where the data is stored in the system. The memory can also allow the user to manually add and store external inputs including reported economic data such as inflation, retail reports, consumer confidence, or managerial judgments such as seasonality, competitive environment, knowledge of future but un-stored promotions, changes or additions to products or services, and local events.

Additional important metrics relative to the time horizons in this document include the market price for the suggested product or service and the standard price stored in the memory for the product or service when measured at the beginning of each of the time horizons above and when measured at the time of the service. The price for any given product or service is based upon supply and demand at a given point in time. The processor can use any or all of the time horizons in this document can be used in conjunction with the stored price information and/or the facility capacity utilization referred to in this document, and related to the financial metrics to automatically adjust the stored or suggested price for any suggested appointment. The processor can also make pricing suggestions for a manager or administrator to manually adjust the pricing that is either stored on the system or applied at the time of purchase through the client account profile or Point Of Sale. The processor can also by suggestion to a user or automatically, increase or reduce the number of available units as well as suggest several different quantities of available units using tiered pricing or variable restrictions on terms and conditions relative to any or all of the time horizons.

In some embodiments, the financial forecasting is produced when the stored attributes of any or all of the historic accumulated or individual client appointment data and any or all of their associated attributes are used in conjunction with any or all of the profiles containing the attributes of each time horizon. The processor may retrieve from memory any or all of the profiles to provide a historic profile of how each time horizon has contributed to the historic financial metrics.

In some embodiments, the reports are not only to be used by people to make changes to the business strategy and policies but are adaptable based on the needs of all parties involved. These reports can be akin to artificial intelligence where the processor determines the best outcome of scheduling Managing Scheduling by Exception Some embodiments manifest an appreciation that there is a great deal of decision process that can occur based on information that is not explicitly called out or provided. A simple example is that of a suggested appointment that is presented to a registered or potential client that is either not received or received yet ignored. From a capacity and available product or service scheduling point of view, if a suggested schedule for a product or service is not received, that is equivalent to a decline which also equivalent to a suggested scheduled event which is received but is ignored. Using suggested information that is not responded to in order to schedule products or services can be very useful especially when combined with time horizons. A simple example of this is that a communication to a client for a particular suggested product or service is ignored within any given time horizon and therefore can be construed as a decline. The next person in line or a virtual line, can be scheduled in place of the suggested schedule for the primary suggested scheduling event. The suggested events can then be offered to patrons in a secondary, tertiary, and beyond virtual position including those on a waiting list for a product or service where capacity is limited within a particular time horizon. There can also be multiple time horizons for similar or identical services based upon other considerations including but not limited to preferred client status, memberships, in an entity Payroll and Scheduled Event Costs A pay module for employees or contractors associated with the scheduled event also takes into account the attributes of scheduled event, service, or product and can automatically apply any payroll schedule or rates that may be adjusted based upon the acceptance or rejection of the suggested scheduled attributes, including but not limited to sharing of costs with the practitioner for promotional products or services, minimum pay rates, maximum pay rates or caps, and any shared revenue agreements with the practitioner. This can also include automatic bonuses for the practitioner based upon business metrics or acceptance rates.

Point of Sale (POS)

In some embodiments, payment for the suggested services or products is taken by the system. This can be done wither with an integrated POS or an external POS. In the case of an integrated POS, acceptance of the suggested product or service can automatically or on demand, deduct payment from the client's account of choice including both merchant processing payment systems and internal credit or pre-paid account systems. This payment can take the form of reservations with or without cancellation policies in place. Prices can be adjusted based upon changes and or cancellation fees can be applied. It can also provide payment for other associated clients. This POS system can also be used for other products and services than the suggested scheduled events and can include merchandise with multiple inventory attributes that can be uploaded via documents including delimited test files, CSV files, Microsoft Excel files, Apple Numbers files. Payment can also be applied using an external POS system where the payment is manually processed.

In some embodiments, client payment information is protected using an encrypted system. All client information is encrypted and is electrically and physically separated from access to any networks with the exception that it can be shared on a network when the information is being used to actively communicate with any merchant or account processing sites. All ports are closed while the client information is not actively being used during the transaction process. The security system also divides client information including names and financial payment information into sub strings where each substring contains an incomplete portion of the information required to complete the transaction. Encrypted names are stored in a physically and electrically isolated separate memory cache than payment account numbers. The payment account numbers are also broken into substrings and encrypted. Each encrypted substring is again stored in separate physically and electrically isolated memory caches. At the time of payment, each of the required encrypted substrings is accessed and reconstructed into the complete required payment information. No two memories are accessed concurrently and all electrical ports or physical separations that provide access to the substrings are opened only while the substring is being accessed. Upon completion of the transaction, all access ports are then closed and all physical separations are re-established and the reconstructed information is purged from the temporary memory cache.

The POS system may also suggest products associated with the suggested service that have a relevant level of synergy.

A suggested appointment schedule which is offered for sale through a third party website and scheduled either through the third party web site or through the local venue web site where either site can offer suggested products or services to the market place.

Scheduling for Multiple Clients

In the case of multiple clients sharing the same resources, change or exception by one of the participants often affects changes in the attributes of the other attendees. Examples of resources include at least one of a practitioner, a room, a piece of equipment or multiple pieces of equipment, a time slot on a particular day; any acceptance.

If multiple clients are sharing a teacher and possibly other resources—and one client makes a change, it will affect the scheduling and management environment. Attributes and assets that will be affected can include but not be limited to:

Increased or decreased capacity—more or less equipment or product is available

A possible price change to the existing and remaining or additional clients

A possible pay change to the practitioner

A possible substitution of a standby client who may accept the suggestion based on history or a documented profile A possible behavioral change by any associated clients, canceling for example In some embodiments, exceptions by one client can result in the future suggested scheduling events of associated clients such as "also cancel the additional clients/clients." They can also add substitute clients and provide products or services that are freed up by exceptions to capacity.

In some embodiments, any schedule changes to one or more clients can automatically be applied to the schedule of associated clients. Changing an appointment of three people to two, two to one, or vice versa for example can automatically update all the resources required for the changes for all the associated clients. Associated clients may include the next person in line in the case of expanded capacity resulting from a cancellation of any appointment including an individual or shared scheduled event.

In some embodiments, suggested fill in clients or alternative services can also be presented internally to the management staff such that they can respond to changes efficiently and adjust any parameters affecting financial metrics or attributes including ROIC, profitability, capacity, pricing, availability including time horizons for booking or cancelling among others.

In some embodiments, each of the most often used configurations can be presented in an icon on the screen where icons representing a single person appointment, or a shared instructor for multiple person scheduling. A client name can be simply dragged over a single, dual, trio, quad, or extended shared instructor or resource. The act of scheduling a single person for a multiple person event may offer suggested appointments with highly likely associated clients and upon acceptance or selection, schedule all associated people for the product and or service, and deduct the relevant capacity elements from the operation. It can also send a confirmation to any or all participants and any exceptions to the process can be integrated into either an acknowledgement or a decline of the product or service.

In some embodiments, scheduling multiple clients based upon an association with single client can be done by proposing or suggest the appropriate schedule for all the clients and resources based upon their association with other clients. For Instance, Typing or speaking "John Doe Trio" may present preferred scheduling event for John Doe and any other two associated clients and products or services, as well as resources, schedule them appropriately with all the required attributes, and confirm the acceptance with a single stroke as opposed to individually and sequentially scheduling all the associated clients and resources. This can reduce a many keystroke or acknowledgement process to a single keystroke. It can also positively affect utilization, revenue and margin based on the simple probability that a single client can book a product or service for their group with a single keystroke. The multiple client suggested appointment can for example suggest in declining order of relevance, "an appointment for John Doe, John Doe Jr. and John Doe II for a trio" at multiple times and days based on history. A single acknowledgement can schedule all three. This concept is scalable in either direction both down to individuals or up to many in a group.

In the case of food service, an associated person, can simply be the next person in a virtual line where the available capacity of an operation based on a time horizon or exception steps to the next potential client. That client can be someone that has been detected by their network and is being informed that their preferred product can be available in a given time horizon. That association can be created by many logistical events including but not limited to the virtue of their proximity to the available suggested scheduled product or service as detected by a network. It may also simply be presented as a typical history. This may actually allow food service providers to prepare food in real time via a virtual line in conjunction with the physical line and the client may avoid the time of waiting in line and paying. They may simply walk in and pick up their freshly prepared order.

There are many implementations and embodiments of this. One embodiment is that of scheduling a fitness session where a particular historic behavior of a client or user, or an exception to a historic behavior pertaining to previously scheduled services, where the historic behavior is stored in a profile. The behavior that is stored in the profile is recognized or learned by the processor. The historic behavior or based upon or a profile. The historic behavior can be associated with any number of attributes required to successfully schedule the time slot and the stored profile. The attributes of the stored profile historic behavior include but are not limited to:

A history of regular start times for a scheduled appointment

A history of regular stop times or durations for a scheduled appointment

A history of appointment types

A history of specific practitioners

A history of required or preferred pieces of equipment or machines

A history of required or preferred logical spaces

A history of recurrences for an appointment

A history of time horizons between the booking time and date and the suggested scheduled start time and date A history of prices for appointment types A history of locations where the appointment has been scheduled A history of other clients or guests that have concurrently shared the scheduled time slot and practitioner or instructor and any associated assets or attributes that were associated with the concurrent shared appointments A history of shared scheduled appointment time slots where an exception by one participant for the scheduled time slot triggers a suggested schedule change to the other participants in the scheduled time slot, including pricing changes, cancellations, re-schedule changes, equipment or logical space reservation changes, and any required asset changes necessary to increase or decrease the participants for the suggested schedule time.

A history of payment type or terms of payment

A history of acceptance or rejection of the suggestion based upon non-standard pricing or promotions A history of services which were procured via third party resellers such as Mass Buying Power Sites or Deal of the day sites.

A history pulled from a profile that resides in memory on a third party site or the remote device that is compared to the offerings of locations where the user has never visited A history of payment method.

In some embodiments, the processor acts upon the historic behavior that is stored in the profile and suggests the appropriate appointment or product along with all the other relevant attributes and resources. The system can be configured to await a confirmation to schedule a suggested appointment or automatically schedule the suggested appointment. The confirmation can consist of a single click on an icon or a voice command acknowledging the appointment. It can also consist of multiple clicks to accept a suggestion or to accept a suggestion with modifications. Ignoring the suggestion can be taken as either a confirmation or a rejection depending upon the configuration of the stored profile of the client. The scheduler can be either a client or user that signs into the system or an administrator for that client or user that is scheduling the appointment for a client or user.

Scheduling for appointments where multiple resources are required to be reserved are done in the Fitness, Spa, Health, Personal Training, Beauty, Medical, Food Services, and Martial Arts industries. There are numerous subsets of each of these industries where particular appointment types or products also require more than simply a facility to attend. They require that a practitioner is available at the appropriate time and the appropriate equipment or logical space is available to complete the appointment. In the Health, Fitness, Spa & Beauty industries, these subsets include: Acupuncture, Massage Reike, Rolfing, Personal Training, Pilates, Gyrotonic®, Yamun® Body Work, TRX, Cross-Core, Power Plate®, Fitness Boot Camps, Yoga, Bosu, Zumba, Surfing, Strength Training, Spinning, Fusion and Core Fusion, Gymnastics, Cross Fit®, Facials, Waxing, Skin Care, Makeup, Hair Dressing and Cutting, Barre, Dance, Manicures and Pedicures. In martial Arts, the appointment types include Karate, Judo, Tai Kwon Do, Krav Maga Jiu Jitsu, Tai Chi. In the Medical Industry, they include regular Doctor's visits, Dental Visits, Recurring testing.

Scheduling in the food service industry includes restaurant reservations, scheduling take out food including salads, coffee, coffee drinks, hot chocolate, sodas, waters, tea, doughnuts and pastries, juices, smoothies, frappes, shakes, pizza, submarine sandwiches and Gyros, sandwiches, Paninis, pasta, prepared meals, deserts, breakfast sandwiches, bagels, wraps, tacos, burritos.

All of these industries may benefit from the efficiencies and business management aspects of behavioral scheduling.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A system comprising:
a memory;
at least one processor coupled to the memory; and
a scheduling component executable by the at least one processor and configured to:
receive, from a user over a computer network, a request to schedule a personal services appointment, the request including an identifier of a user profile associated with the user, wherein the user is a client of the personal services appointment;
access the user profile associated with the user, the user profile stored on the system and containing at least one previous personal services appointment associated with the user;
identify a plurality of characteristics of the request to schedule the personal services appointment, the plurality of characteristics determined from the at least one previous personal services appointment in the user profile;
determine that a plurality of resources specified in the plurality of characteristics are available during at least one time slot, the plurality of resources specified in the plurality of characteristics including a service provider and at least one of a scheduled service offered by the service provider during the at least one time slot and a physical location at which the service provider offers the scheduled service during the at least one time slot;
generate a suggestion model by providing the plurality of characteristics to a machine learning program using an iterative convergent computational method, wherein the machine learning program is further configured to determine an adjusted forecast based on the at least one previous personal services appointment;
apply a plurality of inputs to the suggestion model to generate at least one proposed personal services appointment for the at least one time slot, the at least one proposed personal services appointment having the plurality of resources specified in the plurality of characteristics during the at least one time slot; and
adjust presentation attributes of the at least one proposed personal services appointment based on properties of an interface window presenting the at least one proposed personal services appointment on a device remote from the system on the computer network.

2. The system of claim 1, wherein the plurality of characteristics includes a price and the scheduling component is configured to determine the price based on a temporal difference between an identified time and the at least one time slot.

3. The system of claim 2, wherein the scheduling component is configured to determine the temporal difference based on a physical proximity between a location of a user associated with the profile and a location of at least one resource of the plurality of resources.

4. The system of claim 2, wherein the scheduling component adjusts the price proportionally in relation to a size of the temporal difference.

5. The system of claim 2, wherein the price is based on a rate of a service provider and the scheduling component is configured to identify the rate as being at least one of a minimum rate, a maximum rate, a percentage rate, and an hourly rate based on the temporal difference.

6. The system of claim 2, wherein the at least one proposed personal services appointment includes a plurality of proposed personal services appointments and the system is configured to present the plurality of proposed personal services appointments in decreasing order of relevance.

7. The system of claim 6, wherein the system is configured to adjust presentation attributes of the plurality of proposed personal services appointments based on a type of device presenting the proposed personal services appointments.

8. The system of claim 6, wherein the system is further configured to present a link to a standard scheduling screen.

9. The system of claim 2, wherein the system comprises a point of sale and the scheduling component is configured to provide event information to the point of sale and receive transaction information from the point of sale.

10. The system of claim 2, wherein the scheduling component is further configured to record a cost of providing a service associated with the proposed personal services appointment.

11. The system of claim 2, further comprising an administrative user interface configured to receive input requesting manipulation between at least one event category and users.

12. A method of scheduling at least one time slot, the method comprising:
receiving, at a local system from a user over a computer network, a request to schedule a personal services appointment, the request including an identifier of a user profile associated with the user, wherein the user is a client of the personal services appointment;
accessing, at the local system, the user profile associated with the user, the user profile stored on the local system and containing at least one previously personal services appointment associated with the user;
identifying a plurality of characteristics of the request to schedule the personal services appointment, the plurality of characteristics determined from the at least one previous personal services appointment in the user profile;
determining that a plurality of resources specified in the plurality of characteristics are available during at least one time slot, the plurality of resources specified in the plurality of characteristics including a service provider and at least one of a scheduled service offered by the service provider during the at least one time slot and a physical location at which the service provider offers the scheduled service during the at least one time slot;
generating a suggestion model by providing the plurality of characteristics to a machine learning program using an iterative convergent computational method, wherein the machine learning program is further configured to determine an adjusted forecast based on the at least one previous personal services appointment;
applying a plurality of inputs to the suggestion model to generate at least one proposed personal services appointment for the at least one time slot, the at least one proposed personal services appointment having the plurality of characteristics requesting the plurality of resources during the at least one time slot; and
adjusting presentation attributes of the plurality of the at least one proposed personal services appointment based on properties of an interface window presenting the at least one proposed personal services appointment on a remote system on the computer network.

13. The method of claim 12, wherein the plurality of characteristics includes a price, further comprising determining the price based on a temporal difference between an identified time and the at least one time slot.

14. The method of claim 13, further comprising determining the temporal difference based on a physical proximity between a location of a user associated with the profile and a location of at least one resource of the plurality of resources.

15. The method of claim 13, further comprising adjusting the price proportionally in relation to a size of the temporal difference.

16. The method of claim 13, wherein the price is based on a rate of a service provider, further comprising identifying the rate as being at least one of a minimum rate, a maximum rate, a percentage rate, and an hourly rate based on the temporal difference.

17. The method of claim 13, wherein the at least one proposed personal services appointment includes a plurality of proposed personal services appointments, further comprising presenting the plurality of proposed personal services appointments in decreasing order of relevance.

18. The method of claim 17, further comprising adjusting presentation attributes of the plurality of proposed personal services appointments based on a type of device presenting the proposed personal services appointment.

19. The method of claim 17, further comprising presenting a link to a standard scheduling screen.

20. The method of claim 13, further comprising:
providing event information to a point of sale; and
receiving transaction information from the point of sale.

21. The method of claim 13, further comprising recording a cost of providing a service associated with the at least one proposed personal services appointment.

22. The method of claim 13, further comprising presenting an administrative user interface configured to receive input requesting manipulation between at least one event category and users.

23. The system of claim 1, wherein the service provider is a person selected from the group consisting of a staff person, an instructor, a practitioner, a beautician, a therapist, a barista, a chef, a performer, a doctor, and an attorney.

24. The system of claim 1, wherein the personal services appointment is an in-person appointment at which the user and the service provider are present at the physical location during the at least one time slot.

* * * * *